US006353169B1

(12) United States Patent
Juszkiewicz et al.

(10) Patent No.: US 6,353,169 B1
(45) Date of Patent: Mar. 5, 2002

(54) UNIVERSAL AUDIO COMMUNICATIONS AND CONTROL SYSTEM AND METHOD

(75) Inventors: Henry E. Juszkiewicz, Nashville, TN (US); Thomas L. Sherman, St Paul, MN (US); Richard A. Frantz, Hatboro, PA (US); Jason S. Flaks, Pacifica, CA (US)

(73) Assignee: Gibson Guitar Corp., Nashville, TN (US)

( * ) Notice: Subject to any disclaimer, the term of this patent is extended or adjusted under 35 U.S.C. 154(b) by 0 days.

(21) Appl. No.: 09/557,560

(22) Filed: Apr. 25, 2000

Related U.S. Application Data

(60) Provisional application No. 60/131,031, filed on Apr. 26, 1999, and provisional application No. 60/156,003, filed on Sep. 23, 1999.

(51) Int. Cl.[7] .................................................. G01H 7/00
(52) U.S. Cl. ............................... 84/600; 84/645; 369/4; 370/420; 381/118
(58) Field of Search ....................... 84/600, 645; 369/4; 370/276, 420; 381/118

(56) References Cited

U.S. PATENT DOCUMENTS 5,402,499 A * 3/1995 Robison et al.
5,487,067 A * 1/1996 Matsushige
5,768,350 A * 6/1998 Venkatakrishnan ..... 370/418 X
5,917,835 A * 6/1999 Barrett et al.
5,933,430 A * 8/1999 Osakabe et al. ............ 370/395
5,995,512 A * 11/1999 Pogue, Jr.

OTHER PUBLICATIONS

"Objectives for DTE Power Study Group" dated Nov. 10, 1999, as approved by DTE Power via MDI SG.
"Avio Digital and Apogee Technology Announce Partnership to Develop Digital Audio Home Network" cited at www.horizonpr.com.
"The Digital Harmony Roadmap" cited at www.digitalharmony.com.
Multi–Channel Audio and Music Data Rides on the IEEE 1394 High–Performance Serial Bus cited at www.yamaha.co.jp.
"Architecture Acoustics" cited at http://aa.peavey.com.
"White Paper: Digital Audio Distribution Systems" cited at www.peakaudio.com.
"Soundweb—It's Time to Look at the Future of Your Facility's Sound System" cited at www.bssaudio.co.uk.

* cited by examiner

*Primary Examiner*—Jeffrey Donels
(74) *Attorney, Agent, or Firm*—Waddey & Patterson; Lucian Wayne Beavers

(57) ABSTRACT

An audio communications and control system includes a plurality of audio devices each of which includes a device interface module for communication of digital audio data and control data from at least one of the devices to at least one other of the devices. A universal data link is operatively connected to each of the device interface modules. The device interface modules and universal data links are operative in combination to connect the devices together in the system and provide full duplex communication of the digital audio data and control data between the devices.

32 Claims, 5 Drawing Sheets

UNIVERSAL AUDIO COMMUNICATIONS AND CONTROL SYSTEM AND METHOD

This application claims benefit of our previously filed provisional applications Ser. No. 60/131,031, filed Apr. 26, 1999, entitled "Universal Communications and Control System For Amplified Musical Instrument", and Ser. No. 60/156,003 filed Sep. 23, 1999, entitled "Universal Communications and Control System For Amplified Musical Instrument".

BACKGROUND OF THE INVENTION

This invention pertains to systems for enabling the communication of signals and data between a musical instrument and electronic components needed to control and re-produce sounds generated by that instrument. More specifically, this invention relates to a system and method that facilitates the interconnection of one or more diverse musical instruments and related audio components on a universal network for purposes of communication of audio signals and signals to identify and control the devices.

The generation, transmission, amplification and control of audio signals and devices involves diverse yet interrelated technologies that are changing rapidly. The development and implementation of high bandwidth digital communication technologies and distribution systems is significantly affecting all media industries, from book publishing to television/video broadcasting. Products, systems, and services that affect the sense of sight or sound are converging in the use of common technologies and distribution pipelines. This has a profound effect, not only on the nature of the products that are produced, but on the sales channels and the nature of producing content for those products.

Current examples of the convergence of audio and digital technologies are the arrival and consumer acceptance of the MPEG-3 digital music format, the inexpensive recordable CD (e.g., the "MiniDisc"), and the high bandwidth Internet. However, the markets for technology-driven products are not served by implementation of multiple technical standards. Typically, a new technology begins in its early phase with multiple standards, which in many cases are vigorously debated and disputed among various advocates for the different standards. In most technology-driven industries that prosper, a single standard historically is universally adopted by members of that industry. Examples of such standardization include AC versus DC household electrical supply, Postscript printing language, and VHS versus Beta video recording format. Similarly, there is a need for a universally accepted standard for digital communication of audio and video content. Because of the overwhelming acceptance of the Internet and its TCP/IP protocol, coupled with a substantial pre-existing infrastructure of network hardware, software, and know-how, a universal standard for digital audio/video communication and control should revolve around this well-known TCP/IP and Internet technology.

The weakness of the existing audio hardware market is in its application of digital electronic technologies. Today's musicians can record and process multi-tracks of high quality sound on their computers but are forced to plug into boxes with 1950's era analog circuits. For example, the original challenge in the guitar musical instrument industry was to make the guitar louder. The circuits of the day distorted the sound of the instrument, but did accomplish their task. With time, these distortions became desirable tones, and became the basis of competition. Guitar players are very interested in sound modification.

Digital technology allows a musician to create an infinite variety of sound modifications and enhancements. The guitar player in a small club has a veritable arsenal of stomp boxes, reverb effects, wires, guitars and the like. He generally has a rack of effects boxes and an antiquated amplifier positioned somewhere where the sound distribution is generally not optimal because the amplifier is essentially a point source. Because of this lack of accurate sound placement, the sound technician is constantly struggling to integrate the guitar player into the overall sound spectrum, so as to please the rest of the band as well as the audience who would love to hear the entire ensemble.

Technology has made some progress along a digital audio path. For example, there are prior art guitar processors and digital amplifiers that use digital signal processing (DSP) to allow a single guitar to emulate a variety of different guitar types, amplifier types, and other sound modifications such as reverb and delay. To achieve the same variety of sounds and variations without using DSP technology, a musician would have to buy several guitars, several different amplifiers, and at least one, if not more than one, accessory electronic box.

All existing instruments, if they use a transducer of any kind, output the sound information as an analog signal. This analog signal varies in output level and impedance, is subject to capacitance and other environmental distortions, and can be subject to ground loops and other kinds of electronic noise. After being degraded in such fashion by the environment, the analog signal is often digitized at some point, with the digitized signal including the noise component. Although existing digital audio technologies show promise, it is clear that the audio equipment and musical instrument industries would benefit from a system and method where all audio signals are digital at inception.

At present, there are multiple digital interconnection specifications, including AES/EBU, S/PDIF, the ADAT "Light Pipe" and IEEE 1394 "Firewire". However, none of these standards or specifications are physically appropriate for the unique requirements of live musical performance. In addition, clocking, synchronization, and jitter/latency management are large problems with many of these existing digital options.

Different segments of the music market have experimented in digital audio. Some segments have completely embraced it, but there is no appropriate scalable standard. Clearly, digital components exist, but these are designed as digital "islands". Correspondingly, many manufacturers have chosen to make their small portion of the product world digital but rely mainly on traditional analog I/O to connect to the rest of the world. This may solve the local problem for the specific product in question, but does little to resolve the greater system-oriented issues that arise as the number of interconnected devices grows. In addition, the small sound degradation caused by a analog-to-digital and digital-to-analog transformation in each "box" combines to produce non-optimal sound quality. Finally, the cost, power and size inefficiency related to having each component in a chain converting back and forth to digital begs for a universal, end-to-end digital solution.

Another basic yet important part of the problem is that live musicians need a single cable that is long, locally repairable, and simple to install and use. In addition, it is highly desirable to support multiple audio channels on a single cable, as setups often scale out of control with current multiple cable solutions. Also, phantom power is preferred over batteries as means to power the active circuits used in digital instruments.

Based on the technology trends and patterns that have already been established, a digital guitar will emerge with the transducers (pick-ups) feeding a high bandwidth digital signal. This advance will remove many detrimental aspects of the analog technology it will replace, including noise, inconsistent tonal response from time to time, and loss of fidelity with a need for subsequent signal processing. The introduction of digital technology from the instrument will allow the entire signal path and the equipment associated with the signal path to be digital. Unfortunately, there is no system available that will easily and quickly interconnect multiple musical instruments and associated audio components so that they can communicate with each other and be controlled entirely in the digital domain, using a universal interface and communications protocol.

Performing musicians need a new, performance-oriented solution that provides multiple channels of advanced fidelity audio, intuitive control capabilities, extreme simplicity and total reliability. It is also desirable for this system to be scalable to meet the requirements of permanent installations, including recording studio applications.

SUMMARY OF THE INVENTION

To overcome the limitations and weaknesses of existing analog and digital technologies in the musical performance environment, applicant has invented a system that will allow, in a preferred embodiment, up to sixteen (16) channels of 32 bit—96 kHz digital audio signals and data to flow over a single cable in both directions, using inexpensive connectors and cables already available and in use in virtually every computer network. This cable will also carry sufficient power to allow the electronics in the guitar (or other instrument) to function without a battery or other power source. For convenience, the system of the present invention will sometimes be referred herein as the Global Musical Instrument Communications System (or GMICS). GMICS is a trademark of the assignee of the present invention, Gibson Guitar Corp.

The system of this invention includes the GMICS data link, a high-speed point-to-point connection for communication of digital audio data between two GMICS devices. The system and method of the invention further includes definitions and description of the characteristics of individual GMICS devices as well as GMICS system configuration and control protocols.

The GMICS data link is a high-speed point-to-point connection transmitting full-duplex digital audio signals, control signals, and user data between two interconnected GMICS devices. Self-clocking data are packed in frames that are continuously transmitted between GMICS devices at the current sample rate.

Flexible packing of digital audio data within a frame allows a tradeoff between bit resolution and channel capacity to optimize the fit and interface for GMICS devices having diverse characteristics. A Control data field provides for GMICS system configuration, device identification, control, and status. User data fields are provided for transmitting non-audio data between GMICS devices.

A GMICS system may include two types of GMICS devices—"instruments" and "controllers." An instrument is typically a sound transducer such as a guitar, microphone, or speaker. A controller is typically an intelligent amplifier that provides connections and power for multiple GMICS instruments, and is capable of, and responsible for, configuring the GMICS system. Controllers may also include upstream and downstream connections to other controllers for increased instrument connectivity.

Data link electronics and associated cabling and connectors are designed for reliable use in harsh environments. "Hot-plugging" of GMICS devices is supported by the system.

Accordingly, a Universal Communications and Control System for Amplified Musical Instruments is provided that includes the following novel features:

(1) The Control data for each device includes a "Friendly naming" scheme using a Device ID so that: (a) there is an automatic configuration by, and synchronization to, the system by the identifying device; (b) the use of a "Friendly name" allows the user to name his device on the system; (c) the "device name" resides in the device, not in a data base; and (d) the device ID is available when the device is plugged into a 'foreign' GMICS system.

(2) A bi-directional device interface is provided that adds "response" to the existing instrument stimulus to create a full duplex instrument that is able to display and react to other devices in the system.

(3) The system topology allows for nodal connection of resources so that instruments and control devices plug in to create the desired system complexity and allowing for simple system enhancement by plugging in a new device with the desired features.

(4) The system implements dynamic resource allocation, including: (a) routing of audio and control signals "on the fly"; (b) audio nodes can be 'moved' at will; and (c) special effects devices can be shared with out physically moving or connecting them.

(5) Logical connections are made to the system so that a device can be physically connected into the system through any available connector, e.g., a guitar does not have to be directly plugged into the guitar amplifier.

(6) The system has a multi-layered protocol that supports many different physical transport media and allows for simple expansion of both the number of audio channels and the data bandwidth.

(7) There can be a familiar looking (to the user) point to point connection of devices, or a "star" network (analogous to a "breakout box") configuration for multiple devices, thereby simplifying the user experience.

(8) The system can operate at multiple sampling rates so that different GMICS data links operate at different sample rates within the system.

(9) Phantom power for instrument electronics is delivered over the GMICS data link.

(10) The system can take advantage of conventional network hardware, e.g., one embodiment of a GMICS system is implemented over a 100 megabit Ethernet physical layer using standard Category 5 (CAT5) cable Thus, GMICS is the first low-cost digital interconnection system based on a universal standard that is appropriate for use in the live, professional, studio and home music performance environments. GMICS technology can be quickly adapted for use in musical instruments, processors, amplifiers, recording devices, and mixing devices.

GMICS overcomes the limitations and performance liabilities inherent in current "point solution" digital interfaces and creates a completely digital system that offers enhanced sonic fidelity, simplified setup and usage while providing new levels of control and reliability.

GMICS enables musical instruments and their supporting devices such as amplifiers, mixers, and effect boxes from different vendors to digitally inter-operate in an open-architecture infrastructure.

DETAILED DESCRIPTION OF THE PREFERRED EMBODIMENTS

System Overview

Figure 1:
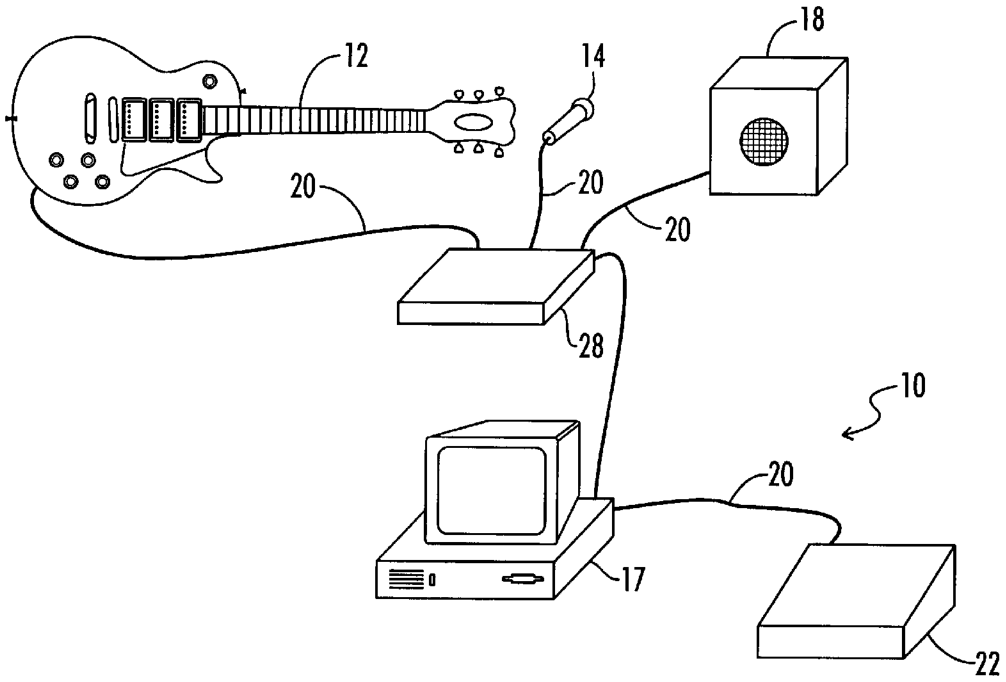
FIG. 1 is a block diagram of the system of this invention showing a typical arrangement that interconnects instrument devices with various control devices.
Figure 2:
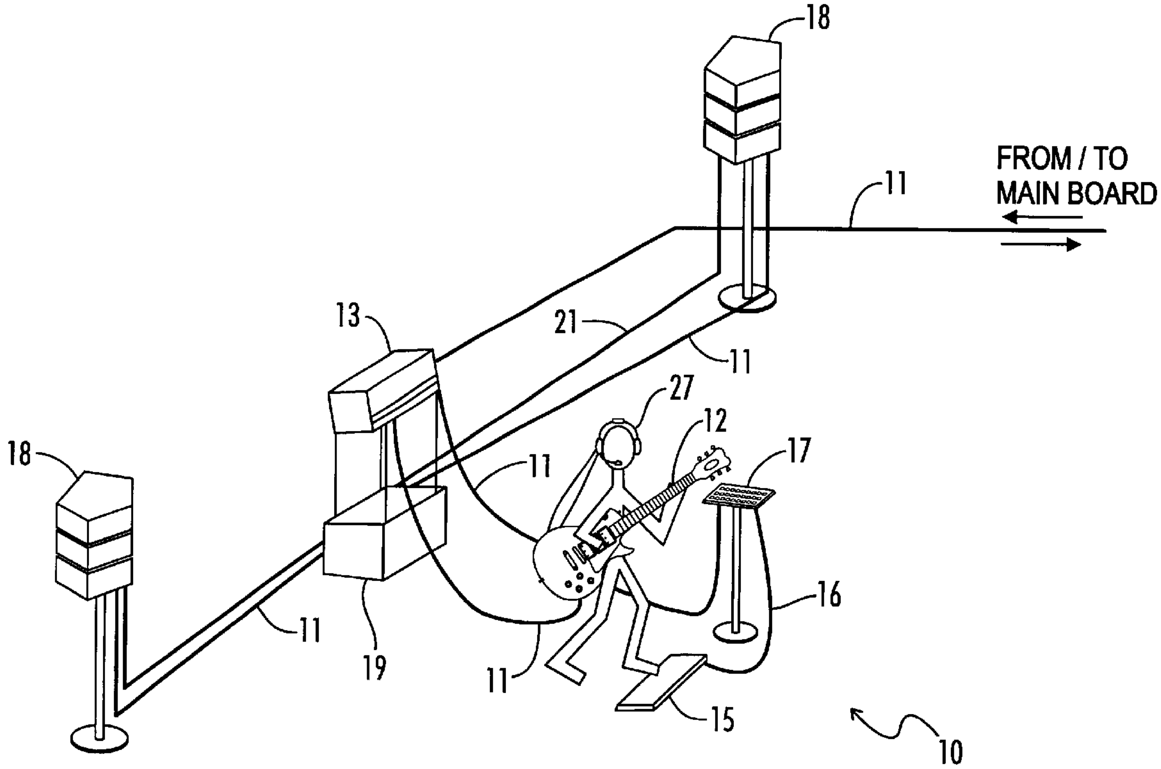
FIG. 2 is a schematic diagram of an embodiment of the system of this invention showing a physical implementation and interconnection of devices in an on-stage performance audio environment.

As shown generally in FIGS. 1 and 2, the topology of a GMICS system 10 of this invention is characterized by a modular, daisy chained bi-directional digital interconnection of musical instrument devices, processing devices, amplifiers and/or recording systems. Each device has a data link connection to one or more other devices. Thus, the system 10 is comprised of instrument and control devices that are interconnected by GMICS data links. Each GMICS device generates, processes, relays, or receives audio data, control data, or both.

For example, as shown in FIG. 2, a guitar setup in a GMICS system 10 may include a guitar 12, an amplifier 13, and a control pedal 15. The guitar 12 may be directly connected to the amplifier 13 through a system data link cable 11. The foot control 15 may be connected through a USB cable 16 to a control computer 17, with the control computer 17 also connected to the amplifier 13 through another link cable 11. Alternatively, the guitar 12 may be directly connected to the control pedal 15, which is in turn connected to the amplifier 13. The guitar 12 contains a system device module 23 (FIG. 4) so that the guitar 12 can generate digital audio data as well as send control data from one or more of its several internal control devices such as a pickup selector, volume control knob, or tone control. The control pedal 15 will generate control data, and relay the audio data sent from the guitar 12. The amplifier 13 will act as a receiver for any control or audio data sent by the guitar or volume pedal. Because the system 10 provides bi-directional communication of audio and control data, it is feasible for amplifier 13 to send control messages or audio back to the guitar 12.

Physical Interface

GMICS is capable of having multiple physical interfaces. This application identifies two physical interfaces, the common instrument interface and the high-speed optical interface.

In one embodiment of the system, the common instrument interface (the connection between a musical instrument and an amplifier) is based on a conventional 100 megabit Ethernet physical layer. The 100 megabit GMICS data link is referred to as the G100TX link. This includes both the data transport mechanism and the interconnecting cables and connectors. One embodiment of the GMICS transport uses standard CAT5 cable and RJ-45 connectors.

Other physical interfaces can include a high-speed multilink optical interface, wireless, and a physical layer interface based on a new gigabit Ethernet physical layer. The wireless applications of a GMICS system are dependent on the current capabilities and bit density of available technology. The high bandwidth optical interfaces are ideal for transporting large numbers of GMICS channels over long distances. This is very useful in large arenas where the mixing console or amplifiers may be hundreds of feet from the stage and require an enormous number of audio channels. Phantom power is not available for optical-based systems.

Electrical Interface

The common interface, G100TX, will transport GMICS data through the link layer protocol used in 100 megabit Ethernet. Data is encoded with a 4bit/5bit scheme and then scrambled to eliminate RF 'hot spots', thus reducing emissions. This is a well-documented and tested data transport with a large installed base. Of the eight conductors in a standard Category 5 ("CAT5") cable, only four are used for data transport. G100TX uses the four unused conductors to supply phantom power for instruments that can operate with limited power. Guitars, drum transducers, and microphones are examples of such devices. Preferably, the G100TX-based GMICS data link supplies up to 500 mA at 9 volts DC to the instrument. The Link Host insures that the GMICS Link power is safe both to the user and to the equipment. Current limiting is done so that the system will become operational after a short circuit has been corrected. Fuses that need replacement when triggered are not recommended.

The GMICS protocol is designed to allow the use of many different physical transport layers. There are a few important rules that must be followed when selecting a possible transport layer for GMICS. First, the transport must have very low latency. GMICS is a real-time digital link. Latency must not only be very low, on the order of a few hundred microseconds, but must also be deterministic. Second, the physical interface must be robust enough to function properly in a live performance environment. A live environment may include high voltage/current cables running near or bundled with a link cable. For a link to be acceptable it must function properly in this harsh environment.

Data Link Interface

Data is transmitted between GMICS devices in the form of discrete packets at a synchronous rate. The GMICS data packets contain a header, 16 audio data pipes, a high-speed user data pipe, the GMICS control data pipe, and an optional CRC-32. The header contains a preamble, start of frame byte, data valid flags, sample rate, frame counter and bus control bits.

Audio data pipes are 32-bit data highways between two GMICS devices. The format for the data in the pipe is identified in the packet header and in some cases in a 4-bit nibble used as a tag in each data pipe. Audio can be 16, 24, 28 or 32 bits of PCM audio data. Specific compressed data formats are also supported and are identified in the tag. Each individual audio pipe can be reassigned as 32 bit data if desired, providing up to 16 extra data channels, with the corresponding non-availability of audio channels.

The GMICS control data pipe is a highway for GMICS-related control messaging. The control pipe can ship multiple types of control including MIDI, although native GMICS control should be used. The control pipe contains a control type byte, version field, 48 bit source and destination address spaces, message field, and a 32 bit data word.

Master Timing Control

In order for all devices within the GMICS system to be processing data in-phase with one another, there must be a single source of synchronization. This source is called the System Timing Master (STM). It can be any non-instrument device and may be selected during the system configuration process. If no device is configured as the STM one will be selected automatically based on system hierarchy. In a situation where multiple devices are hooked up as a daisy chain, three rules are presented which allows for an STM to automatically be selected.

Figure 4:
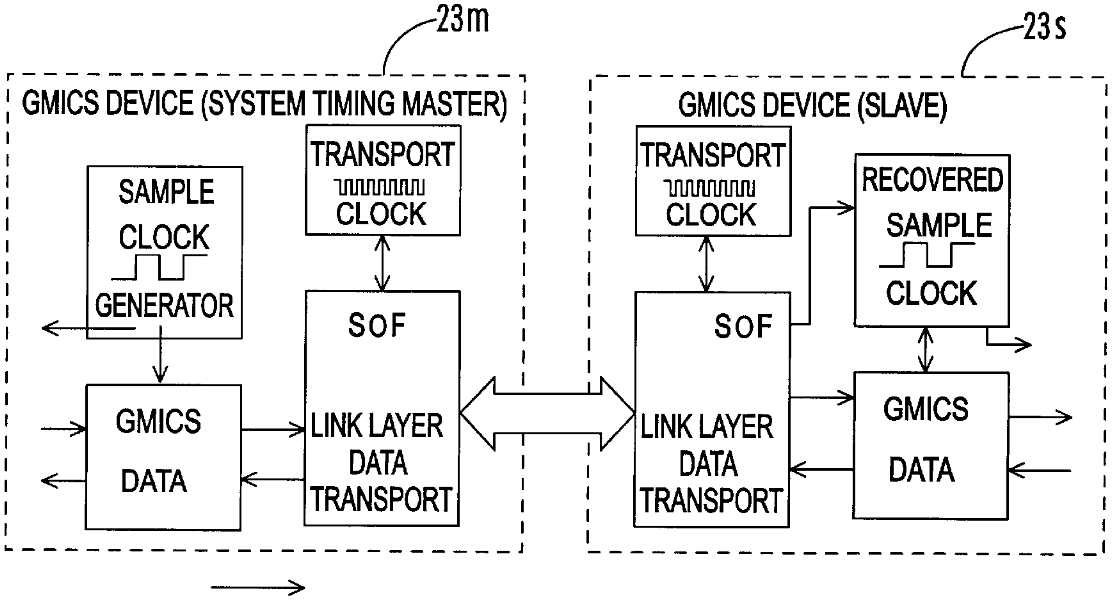
FIG. 4 is a block diagram showing two device interface modules used in instrument or control devices connected to in a GMICS system, with one device interface module configured as a system timing master and a second device interface module configured as a slave.

The GMICS packet timing is synchronous to the audio sample rate of the system. This sample, or packet, timing is either locally generated, in the case of the STM, or recovered and regenerated in a slave device. The transport clock is asynchronous to the sample clock and is only used by the physical layer transport mechanism. FIG. 4 is a simplified block diagram of a device interface module including a GMICS STM 23*m* connected to a GMICS system timing slave device 23*s*. The slave device 23*s* uses only the recovered and regenerated sample clock for encoding/decoding the GMICS data packets.

GMICS Control

Control information is an essential factor in instrument functionality. An intricate native control protocol is used in a GMICS system. GMICS control revolves around 48 bit address spaces that are divided in three 16-bit fields: device, function, and parameter. This allows for access to a device at multiple levels. Device addresses are determined during enumeration. The manufacturer of the device determines the other two address fields. This alleviates the necessity to predefine parameter and controller messages as is done in MIDI systems. Devices can query for other device addresses and associated friendly names by using system control messages. This allows for complete control while still supporting a non-technical, user-friendly interface.

The control type byte allows non-GMICS control messages access to the control pipe or channel. Control message from other specifications can be encapsulated in the 32 bit data word. MIDI is one example of a defined alternate control type.

Device Classification

In the case where no control information is being sent, a device can send a device classification message in place of control data. This message provides information regarding the functionality and capabilities of the device. Any other device in a GMICS system can use this information as needed. The device classification method is encapsulated in the 32-bit data word.

Classic Mode

Classic mode is a means of further increasing the simplicity and universality of a GMICS system. Classic mode provides a set of default channel assignments for instruments. This will allow for an unknown device to power up in a known state providing a positive initial user experience. Devices can assign channels in any fashion, but all devices should supply the capability of being in classic mode, unless overridden by a previous configuration. Classic mode can expand to allow for automatic controller assignment, and various other features.

Classic mode assures that devices power up in known states by providing default assignments for all channels. Other devices can communicate by default on known channels. Default channel assignments are given to all applicable instruments. Classic mode increases the universality and simplicity of GMICS in a way that General MIDI provides a common user experience for tone generation. The channel assignments described in this embodiment are defaults; other channel assignments may be used at the discretion of a device manufacturer, but any variation will create incompatibilities with other Classic mode devices.

Acoustic Guitar Classic Mode

An acoustic guitar device in a GMICS system may have the following default channel assignments:

Acoustic Guitar Classic Mode
(Default Channel Assignments for Acoustic Guitars)

| Channel # (decimal) | Assignment |
|---|---|
| 1 | Mono Guitar (Mono Pickup) |
| 2 | Microphone |
| 3–4 | Stereo Guitar |
| 5–10 | Hex Pickup |
| 11–16 | Reserved |

Electric Guitar Classic Mode

An electric guitar in a GMICS system may have the following default channel assignments:

Acoustic Guitar Classic Mode
(Default Channel Assignments for Acoustic Guitars)

| Channel # (decimal) | Assignment |
|---|---|
| 1–3 | Mono Guitar (3 Mono Pickup) |
| 4 | Microphone |
| 5–6 | Stereo Guitar |
| 7–12 | Hex Pickup |
| 13–16 | Reserved |

Keyboard Classic Mode

Electronic keyboards in a GMICS system may have the following default channel assignments:

Keyboard Classic Mode
(Default Channel Assignments for Acoustic Guitars)

| Channel # (deeimal) | Assignment |
|---|---|
| 1 | Mono |
| 2 | Microphone |
| 3–4 | Stereo |
| 5–16 | Reserved |

System Mechanical Detail

The GMICS Connector

G100TX GMICS Link

Figure 5:
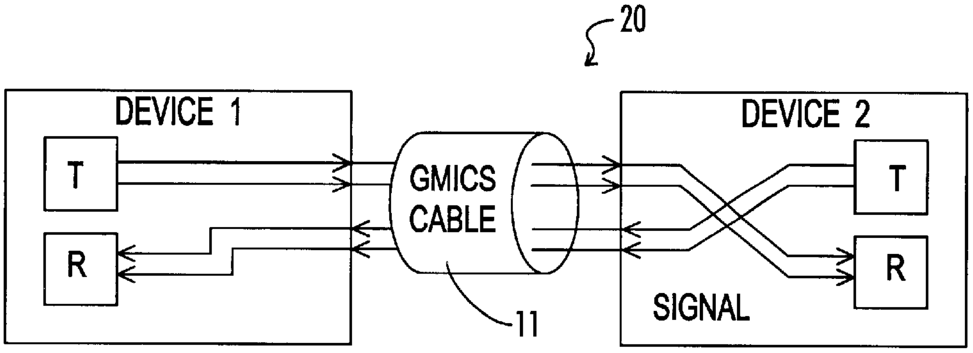
FIG. 5 is a schematic diagram of a crossover connection between linked devices in a GMICS system so that the data transmitted by one device is received by the other device.

The 100 megabit GMICS data link (G100TX) uses the industry standard RJ-45 connector and Category 5 cable as shown in FIG. 5. Preferably, the cables and connectors will meet all requirements set forth in the IEEE802.3 specification for 100BASE-TX use.

GMICS G100TX Signals & Connector Pin Assignment

G100TX-based GMICS uses a standard Category 5 cable for device interconnection. A single cable contains four twisted pairs. Two pairs are used for data transport as in 100BASE-TX network connection. The remaining two pairs are used for power.

Standard Category 5 patch cords are wired one-to-one. This means that each conductor is connected to the same pin on both connectors. A crossover function must be performed within one of the connected devices so that the data transmitted by one device is received by the other, as shown in FIG. 5.

Figure 6:
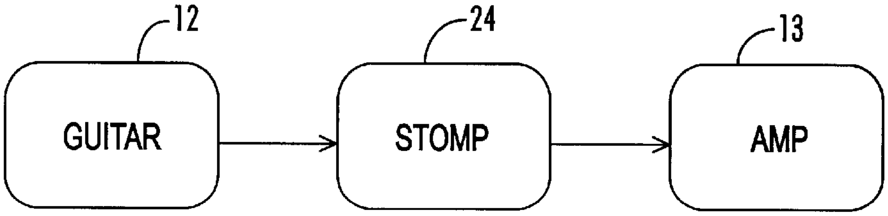
FIG. 6 is a block diagram showing typical connections of guitar, effects box, and amplifier devices in a GMICS system.
Figure 7:
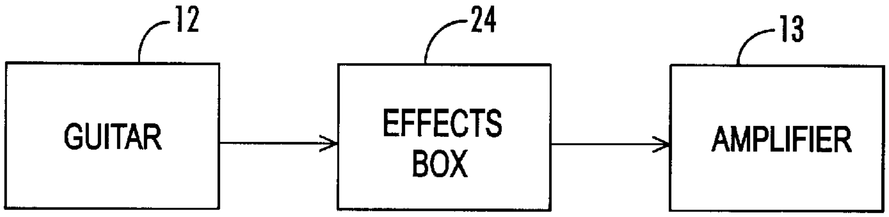
FIG. 7 is a block diagram showing the direction of dominant data flow in a simple GMICS system.

Due to this relationship, a GMICS system has two different connector configurations for GMICS devices. The diagram of FIG. 6 shows a guitar 12, and effect box 24, and an amplifier 13. There are two preferred connector configurations used in the system, labeled A and B in the table below All instruments must use connector configuration A. Amplifiers and other devices use connector configuration B for inputs from instrument and connector configuration A for output to other devices. GMICS connections are made with Category 5 approved RJ-45 plugs and jacks.

The following table lists the signals and connector pin numbers for both the A & B connector configurations.

TABLE

Signal and connector pin numbers

| Signal Name | Type A To Amplifier Pin # | Type B From Instrument Pin # |
|---|---|---|
| Tx Data + (from instrument) | 1 | 3 |
| Tx Data − (from instrument) | 2 | 6 |
| Rx Data + (to instrument) | 3 | 1 |
| Rx Data − (to instrument) | 6 | 2 |
| Gnd (Instrument Phantom Power) | 4 | 4 |
| Gnd (Instrument Phantom Power) | 5 | 5 |
| V + (Instrument Phantom Power) | 7 | 7 |
| V + (Instrument Phantom Power) | 8 | 8 |

The pin number assignments are chosen to insure that signals are transported over twisted pairs. The transmit and receive signals use the same pins that a computer's network interface card (NIC) does. The two pair of wires not used in standard 100BASE-TX networks carry phantom power. This connector pin assignment is chosen to reduce the possibility of damage if a GMICS device is directly plugged into a computer network connector.

Instrument Connectors

All instruments connected to a GMICS system use a RJ-45 Jack wired in the Type A configuration. This connector is labeled To Amplifier.

TABLE

Instrument Type A configuration

| To Amplifier - Type A Configuration Signal Name | RJ-45 Pin # |
|---|---|
| Tx Data + (from instrument) | 1 |
| Tx Data − (from instrument) | 2 |
| Rx Data + (to instrument) | 3 |
| Rx Data − (to instrument) | 6 |
| Gnd (Instrument Phantom Power) | 4 |
| Gnd (Instrument Phantom Power) | 5 |
| V + (Instrument Phantom Power) | 7 |
| V + (Instrument Phantom Power) | 8 |

Effect/Amplifier Connectors

Effect Boxes and Amplifiers may have more than one GMICS connector. There are two possible configurations for these GMICS connections. Inputs from instruments to the effect box or amplifier are wired in the Type B configuration and should be labeled From Instrument. Output from the effect box or amplifier should be wired in the Type A configuration and labeled To Amplifier.

TABLE

Effect/Amp Type B configuration

| From Instrument - Type B Configuration Signal Name | RJ-45 Pin # |
|---|---|
| Tx Data + (from instrument) | 3 |
| Tx Data − (from instrument) | 6 |
| Rx Data + (to instrument) | 1 |
| Rx Data − (to instrument) | 2 |
| Gnd (Instrument Phantom Power) | 4 |
| Gnd (Instrument Phantom Power) | 5 |
| V+ (Instrument Phantom Power) | 7 |
| V+ (Instrument Phantom Power) | 8 |

All connectors that can receive input directly from an instrument use an RJ-45 jack wired in a Type B configuration.

Effect/Amp Type A configuration

| To Amplifier - Type A Configuration Signal Name | RJ-45 Pin # |
|---|---|
| Tx Data + (from instrument) | 1 |
| Tx Data − (from instrument) | 2 |
| Rx Data + (to instrument) | 3 |
| Rx Data − (to instrument) | 6 |
| Gnd (Instrument Phantom Power) | 4 |
| Gnd (Instrument Phantom Power) | 5 |
| V + (Instrument Phantom Power) | 7 |
| V + (Instrument Phantom Power) | 8 |

All other connections use a RJ-45 jack wired in a Type A configuration.

Dominant Data Flow

The terms To Amplifier and From Instrument not only refer to the typical physical connections but also the dominant data flow. While it is true that the GMICS protocol is a symmetrical bi-directional interconnect there is almost always a dominant direction to the data flow. In a simple GMICS system consisting of a musical instrument, an effects box, and an amplifier, the dominant data direction is from the instrument to the effects box then on to the amplifier, as shown in FIG. 8.

Figure 8:
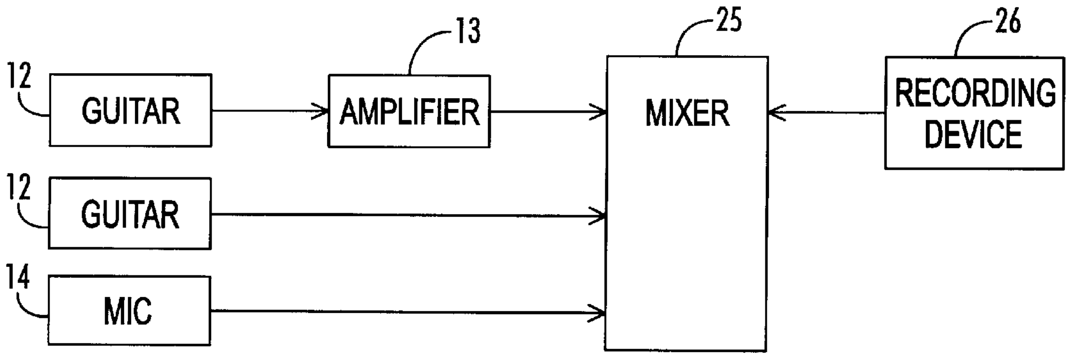
FIG. 8 is a block diagram showing the direction of dominant data flow in a GMICS system that includes a recording device.

In the second example of FIG. 8, three instruments (two guitars 12 and a microphone 14) are connected to through an amplifier 13 to a mixer 25 that is connected to a recording device 26. The recording device 26 does not have a dominant direction of data flow. While recording, the dominant direction is to the recorder 26 while it is from the recorder 26 during playback. For clarity in describing a GMICS system, a recording device 26 will always be treated as an instrument in that the dominant data flows from the recorder.

Special Considerations

Special considerations need to be made when selecting RJ type connectors for use with GMICS. These special requirements are due to the fact that GMICS enabled devices are used in live performance applications by musicians and must be reliable and resilient.

Several physical supports exist that augment the standard RJ-45 connector. This includes the addition of locking clip protection for the RJ-45 connectors. In addition, cable manufacturers can make specially designed cable ends that help the locking clip from breaking. Without some sort of protection these locking clips can be over-stressed and broken. Once the locking clip is broken the connector will not stay properly seated in the mating jack and the connection will be unsatisfactory.

Mechanical stress on the RJ-45 jack must be also considered when designing GMICS enabled devices. The locking nature of the RJ-45 offers advantages and disadvantages. The positive locking provides protection against accidental unplugging. However, the RJ-45 will not automatically release (as will a standard ¼" guitar cable) when the cable is completely stretched or becomes tangled. Therefore it is recommended that the RJ-45 jack and mechanical assembly be able to withstand repeated tugs of the cable without physical or electrical damage.

The GMICS Cable

GMICS G100TX Interconnect Cable

G100TX-based GMICS devices use industry standard computer networking cables for both signal and power. The G100TX data link is designed to use standard Category 5 patch cables of lengths up to 500 ft. Acceptable Cat5 cables must include all four twisted pairs (8 wires). Each conductor must consist of stranded wire and be 24 gauge or larger. The cable and connectors must meet all requirements for 100BASE-TX network usage. It should be noted that GMICS uses the standard computer-to-hub CAT 5 patch cords, not the special computer-to-computer cables. The GMICS cable is always wired as a one-to-one assembly.

The following table shows the connector/cable wiring for a GMICS G100TX Interconnect Cable.

TABLE

Connector/cable wiring

| Signal Name | Twisted pair # | Connector pin # |
|---|---|---|
| Tx Data + (from instrument) | 1 | 3 |
| Tx Data − (from instrument) | 1 | 6 |
| Rx Data + (to instrument) | 2 | 1 |
| Rx Data − (to instrument) | 2 | 2 |
| Gnd (Instrument Phantom Power) | 3 | 4 |
| Gnd (Instrument Phantom Power) | 3 | 5 |
| V + (Instrument Phantom Power) | 4 | 7 |
| V + (Instrument Phantom Power) | 4 | 8 |

Special Considerations

There are special considerations to be made when selecting Category 5 cables for use with G100TX. These special requirements are due to the fact that GMICS enabled devices are used in live performance applications, which place additional requirements on the cable, compared to standard office network installations.

One consideration would be to use a cable that includes protection for the locking clip of the RJ-45 connectors. Without this protection the locking clips can be over-stressed and broken. Once the locking clip is broken the connector will not stay properly seated in the mating jack.

A second consideration is the flexibility and feel of the cable itself. The selected cable should have good flexibility and be constructed such that it will withstand the normal abuse expected during live performances. Unlike most network installations the connecting cable in a G100TX system will experience much twisting and turning throughout its life. For these reasons, stranded CAT5 cable is required for GMICS applications. Solid wire CAT5 will function correctly initially, but will fail more often. It should be noted that cables must be hooked from A connectors to B Connectors, not A to A or B to B. A GMICS system should never be wired in such a fashion that any loops exist.

Also, the pin assignments described with reference to this embodiment are exemplary only and may be varied depending on the choice of cable and connector.

Device Definitions

GMICS is designed to function on two levels: as a daisy-chained system or as a hub-centric system. The following sections give mechanical definitions of devices that may be contained in a GMICS system. All GMICS devices should follow the following rule: No device in a GMICS system should contain more then one type A connector (To Amp).

Instruments

Instruments (guitars, keyboards, etc.) are defined as any device that contains a type A (To Amp) connector only. It should be noted that the GMICS definition of an instrument goes beyond the traditional definition of musical instruments. It is possible for a device such as an amplifier or a signal processor to only contain a type A connector and therefore be considered an instrument according to the above definition. In such a situation a hub would be required to connect a guitar to the amplifier.

Signal Processors

Signal Processors (stomp boxes, effects processors, etc.) should generally have one B (From Instrument) and one A (To Amp) connector. This definition is necessary to allow for signal processing devices to function in both a daisy chain setup and a hub-centric system.

Amplifiers

Amplifiers can either be seen as the end point of a daisy chain system, or as another device capable of being connected to a hub. If an amplifier is considered an end point device, then it will contain only one type B connector (From Instrument). An amplifier that is to be used with hubs should generally have one type B (From Instrument) and one type A (To Amp) connector.

Hubs

Hubs shall generally have multiple type B (From Instrument) connectors and up to one type A (To Amp) connector for connection to another hub. Hubs can have either daisy chain systems or single devices connected to them.

System Electrical Detail

GMICS Physical Layer—G100TX

IEEE802.3 compatibility

The common GMICS data link physical layer (G100TX) is based on the 100BASE-TX Ethernet physical layer as described in the IEEE802.3 Specification. While much of the IEEE802.3 specification is relevant, special attention should be paid to the following clauses:

7. Physical Signaling (PLS) and Attachment Unit Interface (AUI) specifications
21. Introduction to 100 Mb/s baseband networks, type 100BASE-T
24. Physical Coding Sublayer (PCS) and Physical Medium Attachment (PMA) sublayer, type 100BASE-X GMICS G100TX/IEEE802.3 Differences The GMICS data link Physical Layer is always operated at 100 megabits per second in the full duplex mode. Much of the functionality of a standard 10/100 megabit physical layer implementation is dedicated to detecting and switching modes and is not required for G100TX.

Timing Parameters

Sample Clock Recovery

Recovering the sample clock from any digital link is of critical concern to the designer. In GMICS the sample clock is based on the recovered frame rate and not the data transmission rate over the physical medium. The jitter performance required for a specific application must be taken into account when designing the sample rate recovery circuits. For high quality A/D & D/A conversion jitter should not exceed 500 pS.

It is imperative that the recovered sample clock is locked to the incoming sample rate, and it is also desirable that all devices operate in phase with each other. This will insure that all devices are processing data in a synchronous manner.

Only one device may supply sample timing for all devices in a GMICS data link or system. The only exception to this rule would be a device with sample rate conversion capability. The master timing source shall generate GMICS packets on all its GMICS Links with a maximum packet-to-packet jitter of 120 nsec. All other devices must generate all their outgoing packets based on the reception of this stream of incoming packets. The packet-to-packet jitter of these outbound packets must not exceed 160 nsec. Note that accurate measurement requires a jitter free input. This is not a measure of accumulated jitter.

Latency

Latency of data transmitted between directly connected GMICS devices shall not exceed 250 microseconds. This does not include A/D and D/A conversion. As GMICS is designed to be a live performance digital link, care must be taken when choosing A/D and D/A converters to minimize latency within these devices.

Jitter

The jitter performance required for a specific application must be taken into account when designing the sample rate recovery circuits. For high quality A/D & D/A conversion, jitter should not exceed 500 pS. Extreme care must be taken when propagating the sample clock within a large system. The GMICS system is designed with the expectation that the device itself will manage the jitter to an acceptable level. In this manner, the designer can determine the required quality of the resultant jitter at the appropriate cost and return.

Power

G100TX Phantom Power Source

GMICS phantom power sources shall supply a minimum of 9 vDC, at >500 mA to each connected instrument, measured at the cable termination on the instrument.

The phantom power source must supply 24 volts +/−5% (22.8–25.2 volts DC) measured at the source's Type B GMICS Link connector. The phantom power source must be capable of delivering >500 mA to each Type B GMICS data link. Current limiting should occur at a point greater than 500 mA (1 amp recommended). It should not be in the form of a standard fuse, as such a device would need to be replaced if an over-current condition occurred. It is desirable that the full power be restored upon correction of the fault. Each Type B GMICS data link must be independently protected so that one defective link cannot stop all other links from functioning. All Type B GMICS Links must supply the above specified phantom power.

G100TX Phantom Powered Instrument

Phantom powered devices must properly operate on a range of voltages from 24 vDC down to 9 vDC. The phantom powered device must not draw more than 500 mA while in operation. Proper heat dissipation and or cooling of the instrument at 24 vDC must be considered during the physical design of the instrument.

Phantom Power Considerations when using Daisy Chained Devices

Use of Phantom Power

Special consideration must be given to phantom power in a daisy chain configuration of GMICS. If more than one device within the chain were allowed to use the power supplied by the GMICS data link, the power budget would likely be exceeded. Therefore it is recommended that only end point devices, such as instruments, be permitted to use the power supplied by the G100TX cable.

Phantom Power Source and Pass Through

Phantom power distribution must be carefully managed. At first, it would seem that allowing phantom power to physically pass through a device within the chain would be ideal. However, this design can create unsupportable configurations. Since the ultimate chain length is indeterminate, the user could unknowingly violate the maximum cable length specification. Exceeding the maximum cable length would cause excessive voltage drop in the cable thereby limiting the voltage at the instrument to less than the required minimum voltage.

A device may only pass along the phantom power if the available voltage at its Type A GMICS connector is greater than 20 vDC with a load of >500 mA. This simple test will insure that proper power will be supplied to the instrument even when attached by a 500 foot cable. If this condition cannot be met, the device must supply its own phantom power.

Master Timing Control & Device Enumeration

System Timing Master

When dealing with sampled data it is imperative to achieve sample synchronization. This synchronization insures that all devices are processing data in phase with one another. There is always one source of synchronization in a GMICS system, and that device is called the System Timing Master (STM).

Establishing the STM

When multiple devices are daisy chained together or wired in a more hub-centric format, the following three rules are used to establish the STM (these rules are dependent on the device definitions as follows:

1) A device with only A connectors can never be the STM.
2) A device with only B connectors will be the STM.
3) In the case that all non-instrument devices in the system contain A and B type connector configurations, then the one device with no signal on its Type A configuration connector will be the STM.

| Examples of STM |
|---|
| (a) |
| (b) |
| Establishing the STM using rules 1 and 2; (a) Incorrect (b) correct |
| (a) |
| (b) |
| (c) |
| Establishing the STM using rules 1, 2, and 3: (a) incorrect (b) incorrect (c) Correct |
| Establishing the STM with a Hub using rules 1, 2, and 3 |
| Establishing the STM with a Mixer (Hub) using rules 1, 2 and 3 |

Device Enumeration

The STM serves two purposes; it provides the sample clock, and enumerates all devices on the GMICS data link. The enumeration process supplies each GMICS device with the address that it will respond to in response to control messages. Address spaces are 16 bits, which limits the number of devices in a GMICS system to 65,356.

System Startup

All GMICS devices should respond to the "Startup Address" on power up.

| | |
|---|---|
| Startup Device Address | 0xFFFC |

Once a device establishes itself as the STM it will automatically assign itself the base address.

| | |
|---|---|
| Base Device Address (STM) | 0x0000 |

After addressing itself, the STM should begin the enumeration process. Address fields other then the device address fields should use the "not in use" address 0x0000 during enumeration.

Enumeration Algorithm

Since any device other then an instrument can be the STM, it is necessary for all non-instrument devices to be able to perform the enumeration process. For this reason the enumeration algorithm presented here is quite simple. The enumeration algorithm is focused around three system control messages as follows:

| Message type | Message value | Data |
|---|---|---|
| Enumerate device | 0x0001 | Next device address |
| Address offset return | 0x0002 | Source Address + 1 |
| Request new device address | 0x0003 | //ND |
| Enumeration algorithm messages | | |

Daisy Chain Enumeration

In a daisy chain system, the STM will assign itself the base address it will then send an "Enumerate device" message with the "base address" as the source address, and the "startup address" as the destination address.

```
//STM pseudo code
STM.address=0x0000 ;
STM.SendMessage([Destination device address=
   0xFFFC]
  [Source device address=0x0000][Message=0x0001
     (enumerate device)]
  [Data=STM.address+1]);
```

The next device in the chain will receive the "Enumerate device" message from the STM, address itself as the number provided in the incoming message, increment the data field, and then send the new "Enumerate device" message upstream. It is important to recognize that the device should not pass the original STM message along. The new "Enumerate device" message should maintain the source and destination addresses of the original message.

```
//Next device in chain pseudo code
Device2.MessageBuffer=Device2.ReceiveMessage( );
   //Enumerate device
Device2.address=Device2.MessageBuffer.Data//0x0001;
Device2.SendMessage([Destination device address=
   0xFFFC]
  [Source device address=0x0000][Message=0x0001
     (enumerate device)]
  [Data=Device2.address+1]);
```

The process above should be followed for each device in the system except for the last device. The Nth device in the system, which represents the other end point in the daisy chain should address itself with the number provided in the incoming message and then send a "Address offset return" message back to the address provided in the source address field (usually the STM). The "Address offset return" message should use the "base address" (STM) as a destination address, and the device's own address as the source address. The data field should equal the device address plus one.

```
//End point device pseudo code
DeviceN.MessageBuffer = DeviceN.ReceiveMessage( ); //Enumerate device
DeviceN.address = DeviceN.MessageBuffer.Data; //N-1
DeviceN.SendMessage([Destination device address = 0x0000]
    [Source device address = N-1][Message = 0x0002(Address offset)]
    [Data = DeviceN.address + 1]);
```

Hub-centric Enumeration

In a hub-centric system, where the STM will generally be a hub, enumeration will occur slightly different; the hub will select a starting port, and then follow the method provided for the daisy chain system. Once the STM receives the "Address offset return" message, it will move to the next port, and follow the daisy chain enumeration with the data field equal to the number provided by the "Address offset return" message.

```
//Hub (STM) pseudo code
Hub.address = 0x0000;
Next Device Address = Hub.address + 1;
for(int i = 1; i <= Number of Ports; i++)
{
    Hub.port[i].SendMessage([Destination device address = 0xFFFC]
        [Source device address = 0x0000][Message = 0x0001(enumerate
device)]
        [Data = Next Device Address]);
//Follow daisy chain procedure (Section 5.4.2.1);
for(;;)
{
    if (Hub.port[i].ReceiveMessage( ))//Address offset return
    {
            Next Device Address = Hub.MessageBuffer.Data;
            Break;
        }
    }
}
```

In the situation that a hub is connected to another hub, then the second hub should repeat the process above, but use its own address as the starting address. It should also send all messages with its own address as the source address, so that it receives the "Address offset return" message. Upon receiving this message it should forward it to the STM or the previous hub.

```
//Hub pseudo code
Hub.address = M;
Next Device Address = Hub.address + 1;
for(int i = 1; i <= Number of Ports; i++)
{
    Hub.port[i].SendMessage([Destination device address = 0xFFFC]
                [Source address = M][Message = 0x0001(enumerate device)]
                [Data = Next Device Address]);
    //Follow daily chain procedure
        for(;;)
        {
        if (Hub.port[i].ReceiveMessage( )) //Address offset return
        {
            Next Device Address = Hub.MessageBuffer.Data;
                    Break;
        }
    }
}
SendMessage([Destination device address = 0x0000]
                [Source device address = Hub Address][Message = 0x0002(Address
offset)]
                [Data = Next Device Address]);
```

Plugging and Unplugging

Devices may be plugged and unplugged from the system at any time. All other devices in the GMICS system should maintain their current address if this occurs. If a new device is plugged in after startup initialization occurs, or an old device is unplugged and then plugged in again a new address must be assigned. Instead of re-enumerating the whole system, the "Request new device address" message can be used to get a new address.

When a device first plugs in to a GMICS system, it is unaware of whether or not an initial enumeration has occurred. Hence it is the responsibility of the device that it is directly connected to the new device to send the "Request new device address" message. Unless that device is the STM, in which case the STM should acknowledge a new device physically hooked up to it, and then send an "Enumerate device" message with the last address given +1 as the data field.

```
//New device being plugged in
//Directly connected device
Device. SendMessage([Destination address=0x0000]
    [Source address=Device.Address]
    [Message=0x0003(New Address)][Data=NULL]);
//STM
STM. SendMessage([Destination address=0xFFFC]
    [Source address=Device Address]
    [Message=0x0001(Enumerate device)][Data=Last
        Address Given+1]);
//New Device
NewDevice. SendMessage([Destination device address=
    0x0000 ]
    [Source device address=NewDevice.Address]
    [Message=0x0002(Address offset)][Data=
        NewDevice.Address+1]);
```

Data Link Interface

Overview

The data packets sent between GMICS devices are at the heart of the GMICS system. They contain the audio information sent between devices as well as control information.

Figure 9:
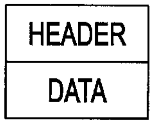
FIG. 9 is a high-level view of a typical GMICS data packet format.
Figure 10A:
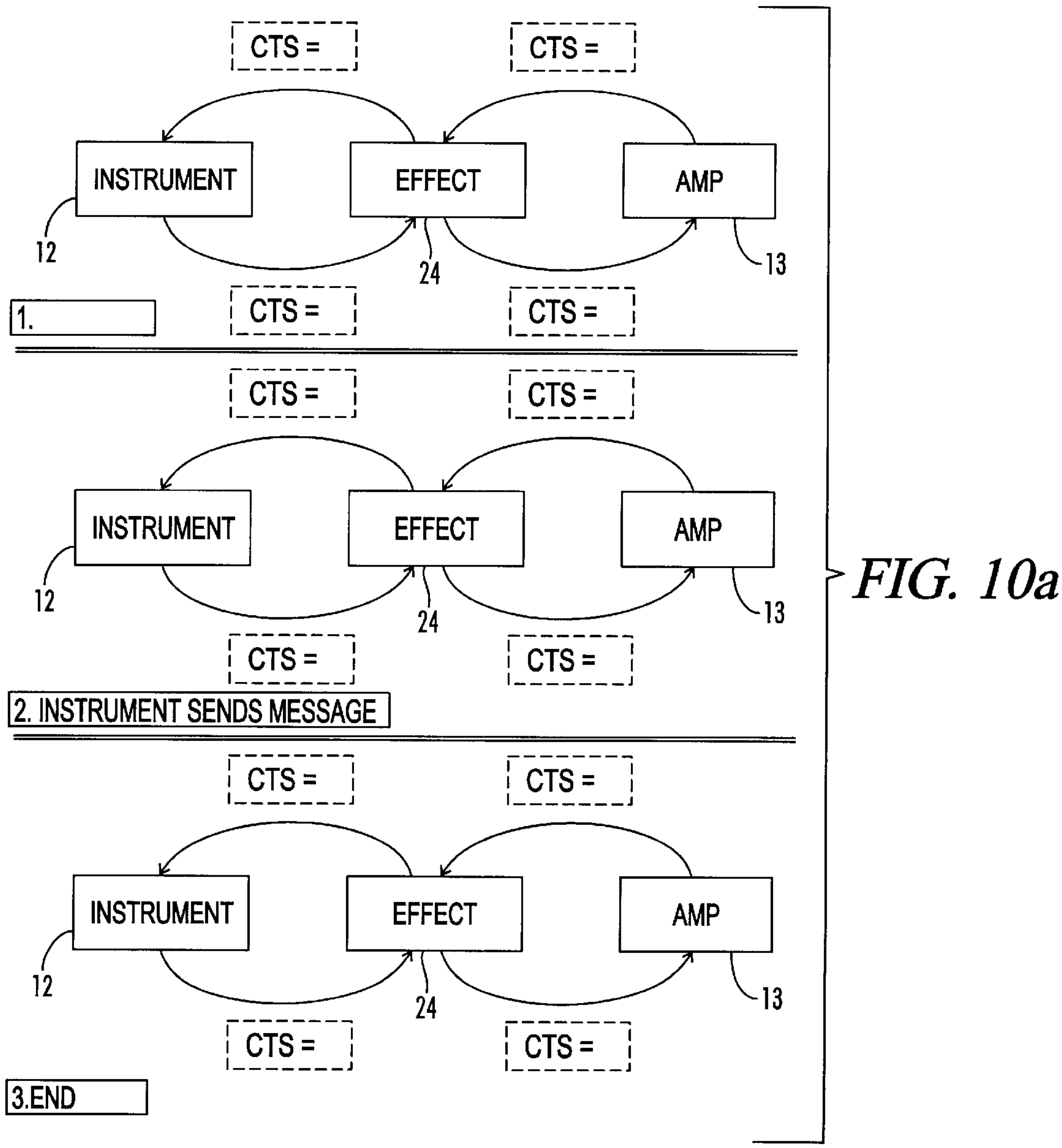
FIGS. 10*a* and *b* are block diagrams illustrating control message flow scenarios among linked devices in a GMICS system.
Figure 10B:
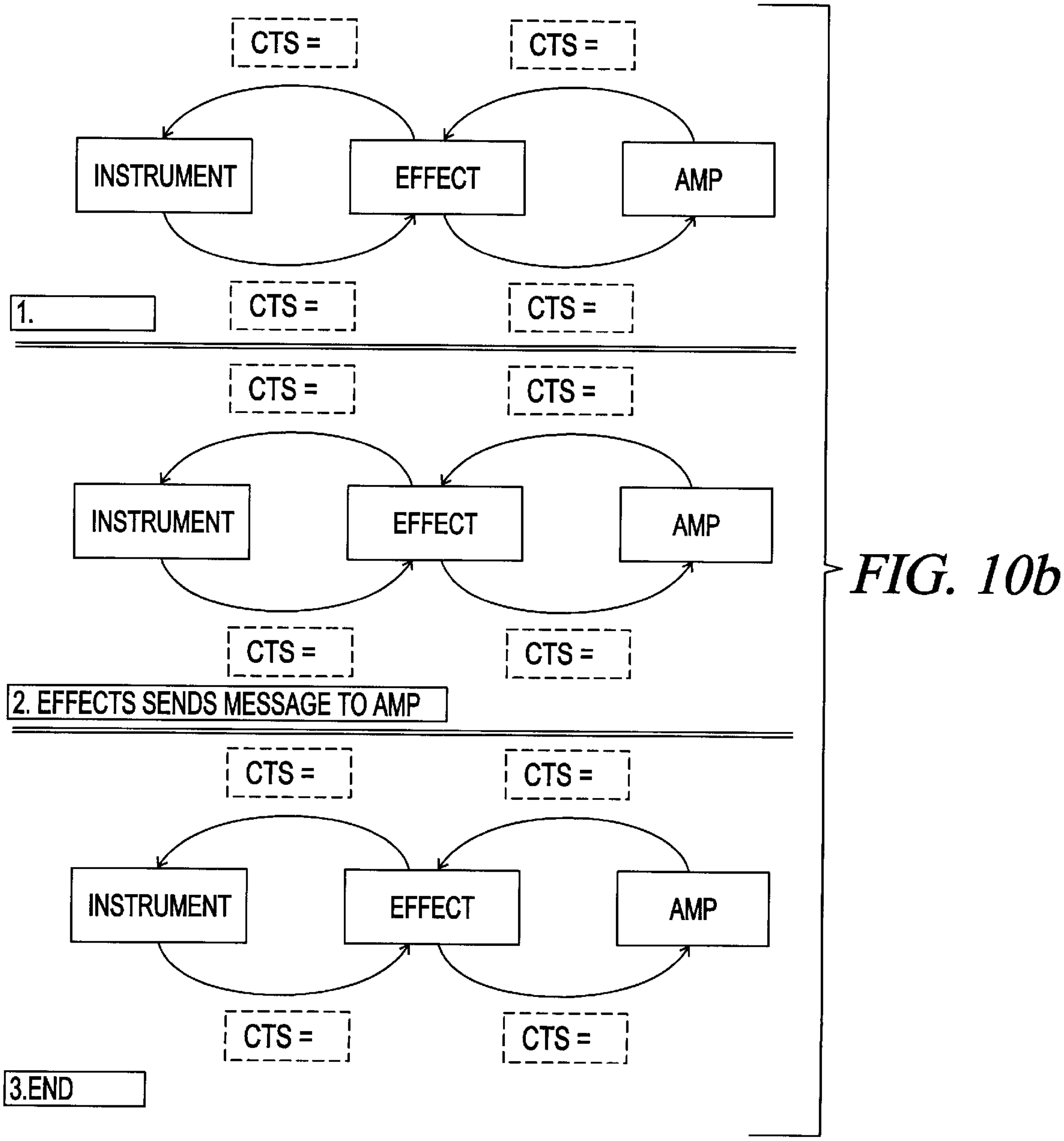

FIG. 9 is a high-level view of the GMICS data packet format. It is broken down into two different sections, the header (see table below) and Audio/Control data. Each GMICS data packet will be a fixed size of 27–32 bit words. The standard GMICS packet shall have 16 channels of 32 bit audio, a control version and type byte, two 48 bit control address fields, a 16 bit control message word, a 32 bit control data word, a 32 bit User High word, and an optional 32 bit CRC. The GMICS packet will have 4 words of header, which will include preamble, start of frame, cable number, sample rate, bus control bits, audio/control valid flags, and a 32 bit frame counter.

GMICS Data Link Header Format
Header Format

<table>
<tr><th>Word</th><th>B31–B28</th><th>B27–B24</th><th>B23–B20</th><th>B19–B16</th><th>B15–B12</th><th>B11–B8</th><th colspan="2">B7–B4</th><th colspan="3">B3–B0</th></tr>
<tr><td>0</td><td colspan="11">Preamble = 0x55555555 (As described in IEEE 802.3 section 7.2.3.2)</td></tr>
<tr><td>1</td><td colspan="2">Start of Frame = 0xD5</td><td colspan="9">Preamble = 0x555555</td></tr>
<tr><td>2</td><td colspan="4">Audio Valid flag bits</td><td>Control/ CRC Valid flag bits</td><td>Cable #</td><td>Sample Rate</td><td>Re-served</td><td>FPF</td><td>CTS</td><td>MIP</td></tr>
<tr><td>3</td><td colspan="11">Frame Count</td></tr>
</table>

Preamble and Start of Frame

These two fields are used as specified in the CSMA/CD IEEE 802.3 specification. For further information, refer to sections 7.2.3.2 and 7.2.3.3 in the IEEE 802.3 specification.

CTS and MIP Fields

These two bits will be used to manage the control bus. It will allow for all devices to send control messages, without requiring enormous buffers. A device will set the Clear To Send (CTS) bit low to indicate to other devices in the system that they may not send a message at this time. This bit should remain low until transmission begins, at which point the bit should be set high to allow other devices to send messages.

The Message in Progress (MIP) bit will be set high to indicate to other devices in the system that a message is being sent. It should remain high until a message is sent in its entirety.

To maintain order on the bus, the following rules must be obeyed:

1) A device can set its CTS bit low at any point, but can not send a message until it has received a minimum of two frames with the MIP bit set low.
2) A device must send its message in its entirety before it can release control.
3) A device must wait a minimum of 8 frames from the end of the last message it sent before another can be sent.

FIG. 11 displays possible scenarios regarding the control bus.

FPF Field

The FPF field gives a high level description of the subsequent data in the GMICS packet. The two defined formats are shown below.

FPF Field Definitions
FPF (Floating Point) definition

| Value (binary) | Description |
|---|---|
| 0 | Words 4–19 in the GMICS packet contain audio information, which will be defined by the label field located in each word. |
| 1 | Words 4–19 contain 32 bit data. |

Sample Rate Field

This field specifies the sample rate of the audio. Five sample rates are supported: 32 k, 44.1 k, 48 k, 96 k, and 192 k. Sample rates and their respective binary representations are shown below.

TABLE

Sample Rate Field Definitions

| Value (binary) | Sample Rate |
|---|---|
| 000 | 32k |
| 001 | 44.1k |
| 010 | 48k |
| 011 | 96k |
| 100 | 192k |
| 101–111 | Reserved |

The default sample rate for all GMICS devices is 48 k. All GMICS devices must support the 48 k sample rate. Devices configured for multiple sample rates should power up at 48 k. The 192 k sample rate is supported by reducing the number of audio channels to 8 and sending two samples per packet. Channels 1–8 should function as normal and provide their corresponding samples. Channels 9–16 should sequentially provide the second samples of channels 1–8.

Cable Number Field

This numeric field is intended for labeling GMICS streams that may be multiplexed onto a high bandwidth medium such as fiber optic cabling.

Control/Checksum Field Format
Control/CRC Valid

| B19 | B18 | B17 | B16 |
|---|---|---|---|
| Control Valid bit | Classification valid bit | User high valid bit | CRC Valid bit |

This 4 bit field tells the receiver whether this packet contains any valid Control, User high, Device Classification, and CRC data. Any of the four bits will be set if there is valid data in their corresponding fields.

Audio Valid Field

This bit field tells the receiver of the packet which Audio Channels contain valid data. There is one bit per channel where a set bit denotes valid audio data. The format of this field is as follows:

Bit 16 =Audio Channel #1 Valid
Bit 17 =Audio Channel #2 Valid
Bit 18 =Audio Channel #3 Valid
. . . etc . . .
Bit 31 =Audio Channel #16 Valid Frame Count Field The frame count field keeps a running count of frames starting at the beginning of transmission. The number stored in this field will roll over when it reaches the maximum 32 bit number 0xFFFFFFFF.

GMICS Data Link Audio/Control Format
Data Format

| Word | B31–B28 | B27–B24 | B23–B20 | B19–B16 | B15–B12 | B11–B8 | B7–B4 | B3–B0 |
|---|---|---|---|---|---|---|---|---|
| 4–19 | Data | | | | | | | |
| 20 | UsrH | | | | | | | |
| 21 | Control Destination Device Address | | | | Version | | Control Type | |
| 22 | Control Destination Parameter Address | | | | Control Destination Function Address | | | |
| 23 | Control Source Function Address | | | | Control Source Device Address | | | |
| 24 | Control Message | | | | Control Source Parameter Address | | | |
| 25 | Control data/Device Classification | | | | | | | |
| 26 | CRC-32 | | | | | | | |

Data Field

The information in the data section of our packet is partially dependent on the FPF field in the header. If the FPF flag is low then our packet will contain 16 channels of Audio. If the FPF flag is high the packet will contain 16 words of 32 bit data.

Audio/Control Data

When the FPF bit is low, the body of a GMICS packet will take on the format shown on the table on the next page:

Audio/Control Packet Format

| Word | B31–B28 | B27–B24 | B23–B20 | B19–B16 | B15–B12 | B11–B8 | B7–B4 | B3–B0 |
|---|---|---|---|---|---|---|---|---|
| 4 | Audio 0 | | | | | | | |
| 5 | Audio 1 | | | | | | | |
| 6 | Audio 2 | | | | | | | |
| 7 | Audio 3 | | | | | | | |
| 8 | Audio 4 | | | | | | | |
| 9 | Audio 5 | | | | | | | |
| 10 | Audio 6 | | | | | | | |
| 11 | Audio 7 | | | | | | | |
| 12 | Audio 8 | | | | | | | |
| 13 | Audio 9 | | | | | | | |
| 14 | Audio 10 | | | | | | | |
| 15 | Audio 11 | | | | | | | |
| 16 | Audio 12 | | | | | | | |
| 17 | Audio 13 | | | | | | | |
| 18 | Audio 14 | | | | | | | |
| 19 | Audio 15 | | | | | | | |
| 20 | UsrH | | | | | | | |
| 21 | Control Destination Device Address | | | | Version | | Control Type | |
| 22 | Control Destination Parameter Address | | | | Control Destination Function Address | | | |
| 23 | Control Source Function Address | | | | Control Source Device Address | | | |
| 24 | Control Message | | | | Control Source Parameter Address | | | |
| 25 | Control data/Device Classification | | | | | | | |
| 26 | CRC-32 | | | | | | | |

Type Field

The type field is a 4 bit field which describes the nature of the information that follows. The type field is formated as follows:

Type Field Format

| B3 | B2 | B1 | B0 |
|---|---|---|---|
| High Level Format (HLF) Field | | Sub Format (SF) Field | |

The following high level formats are defined:

High Level Format Field
HLF Field Definitions

| Value (binary) | High Level Format |
|---|---|
| 00 | Raw Audio |
| 01 | Compressed |
| 10 | Reserved |
| 11 | Reserved |

Sub formats for each high level format are defined below:

Sub Format Field
SF Field Definitions

| Value (binary) | Sub format |
|---|---|
| 00 00 | 28 bit Raw Audio |
| 00 01 | 24 bit Raw Audio |
| 00 10 | 20 bit Raw Audio |
| 00 11 | 16 bit Raw Audio |
| 01 00 | AC-3 |
| 01 01–01 11 | Reserved |
| 10 00–10 11 | Reserved |
| 11 00–11 11 | Reserved |

It should be noted that the recommended default GMICS audio format is 24-bit raw audio.

Audio Fields

Each of the 16 audio channels has a dedicated 32 bit word in the GMICS packet of which 28 bits can be used for data. The format of the audio is given in the type field. Regardless of format the Audio data must be left justified.

32 bit Data

In the case that the FPF field in the GMICS header is high, the body of the GMICS packet will be in the following format:

32 bit Floating Point Data Packet Format

| Word | B31–B28 | B27–B24 | B23–B20 | B19–B16 | B15–B12 | B11–B8 | B7–B4 | B3–B0 |
|---|---|---|---|---|---|---|---|---|
| 4–19 | 32 bit Data | | | | | | | |
| 20 | UsrH | | | | | | | |
| 21 | Control Destination Device Address | | | | Version | | Control Type | |
| 22 | Control Destination Parameter Address | | | | Control Destination Function Address | | | |
| 23 | Control Source Function Address | | | | Control Source Device Address | | | |
| 24 | Control Message | | | | Control Source Parameter Address | | | |
| 25 | Control Data/Device Classification | | | | | | | |
| 26 | CRC-32 | | | | | | | |

32 bit Data Field

This field will provide the ability to pass intermediate 32 bit DSP data around. The 32 bit words will also be available for other 32 bit formats as they become available.

User High Field

The 32 bit user high field is a high speed data pipe that will be available for future applications. A device can use this field to send any data it would like, as long as a receiving device knows how to handle the data.

Control Fields

This 5 word field is set aside for GMICS control messages. The format of these messages and the data contained within can be found in the description of the Control Pipe below.

Device Classification (dc)

In the case that the Classification Valid bit is set in the header, the 32-bit control data word becomes a 32-bit device classification field. Device classification is further described below.

CRC-32 Field

This field contains a 32-bit Cyclic Redundancy Check (CRC) for the data contained in entire data packet. This includes the header and both the audio and data pipe sections. This CRC is based on the standard CRC-32 polynomial used in Autodin, Ethernet, and ADCCP protocol standards. An example of a C language function performing CRC-32 generation is shown below.

```
/*crc32h.c -- package to compute 32-bit CRC one byte at a time using */
/*the high-bit first (Big-Endian) bit ordering convention     */
/*              */
/* Synopsis:              */
/* gen_crc_table() -- generates a 256-word table containing all CRC */
/*       remainders for every possible 8-bit byte. It */
/*       must be executed (once) before any CRC updates.*/
/*              */
/* unsigned update_crc(crc_accum, data_blk_ptr, data_blk_size)     */
/*    unsigned crc_accum; char *data_blk_ptr; int data_blk_size*/
/*    Returns the updated value of the CRC accumulator after */
/*    processing each byte in the addressed block of data.     */
/*              */
/* It is assumed that an unsigned long is at least 32 bits wide and */
/* that the predefined type char occupies one 8-bit byte of storage. */
/*              */
/* The generator polynomial used for this version of the package is */
/*
x^32+x^26+x^23+x^22+x^16+x^12+x^11+x^10+x^8+x^7+x^5+x^4+x^2+x^
1+x^*/
/* as specified in the Autodin/Ethernet/ADCCP protocol standards. */
/* Other degree 32 polynomials may be substituted by re-defining the */
/* symbol POLYNOMIAL below. Lower degree polynomials must first be */
/* multiplied by an appropriate power of x. The representation used */
/* is that the coefficient of x^0 is stored in the LSB of the 32-bit */
/* word and the coefficient of x^31 is stored in the most significant*/
/* bit. The CRC is to be appended to the data most significant byte */
/* first. For those protocols in which bytes are transmitted MSB */
/* first and in the same order as they are encountered in the block */
/* this convention results in the CRC remainder being transmitted wit*/
/* the coefficient of x^31 first and with that of x^0 last (just as */
/* would be done by a hardware shift register mechanization). */
/*              */
/* The table lookup technique was adapted from the algorithm describe*/
/* by Avram Perez, Byte-wise CRC Calculations, IEEE Micro 3, 4(1983).*/
#define POLYNOMIAL 0x04c11db7L
static unsigned long crc_table[256];
void gen_crc table()
/* generate the table of CRC remainders for all possible bytes */
{register int i, j; register unsigned long crc_accum;
for(i=0; i<256; i++)
   {crc_accum =((unsigned long)i<<24);
   for(j=0; j<8; j++)
      {if(crc_accum & 0x80000000L)
         crc_accum =
            (crc_accum<<1)^ POLYNOMIAL;
         else
            crc_accum =
            (crc_accum<<1);}
   crc_table[i]=crc_accum;}
return;}
unsigned long update_crc(unsigned long crc_accum, char *data_blk_ptr,
            int data_blk_size)
/* update the CRC on the data block one byte at a time */
{register int i, j;
for (j=0; j<data_blk_size; j++)
   {i=((int)(crc_accum>>24) ^ *data_blk_ptr++) & 0xff;
   crc_accum=(crc_accum<<8) ^ crc_table[i];}
return crc_accum;}
```

Control Pipe Specification

Overview

Each GMICS packet provides a control type byte, a version byte, a 48 bit destination address field, a 48 bit source address field, a 16 bit message field, and a 32 bit field for control data. The control information can be in any of the defined formats, which are currently GMICS and MIDI.

Control Message Format

| Word | B31–B28 | B27–B24 | B23–B20 | B19–B16 | B15–B12 | B11–B8 | B7–B4 | B3–B0 |
|---|---|---|---|---|---|---|---|---|
| 21 | Control Destination Device Address | | | | Version | | Control Type | |
| 22 | Control Destination Parameter Address | | | | Control Destination Function Address | | | |
| 23 | Control Source Function Address | | | | Control Source Device Address | | | |

-continued

| Control Message Format | | | | | | | | |
|---|---|---|---|---|---|---|---|---|
| Word | B31–B28 | B27–B24 | B23–B20 | B19–B16 | B15–B12 | B11–B8 | B7–B4 | B3–B0 |
| 24 | Control Message | | | | Control Source Parameter Address | | | |
| 25 | Control Data | | | | | | | |

Control Type Byte

The control message byte will indicate the type of control message that follows.

| Control Message Type Format<br>Control Message Type Definitions | |
|---|---|
| Value (binary) | Control Message Types |
| 0000 0000–0000 1111 | Reserved |
| 0001 SPVV | MIDI |
| 0001 0011–0001 1111 | Reserved |
| 0010 0000–0111 1111 | Reserved |
| 1TPC CCCC | GMICS Control |

MIDI Control Message Type

When MIDI is used for control, the control message byte will take the form shown below.

| MIDI Control Message Type Byte | | | | | | | |
|---|---|---|---|---|---|---|---|
| B7 | B6 | B5 | B4 | B3 | B2 | B1 | B0 |
| 0 | 0 | 0 | 1 | SysEx | JPF | # of Valid Bytes | |

If the SysEx bit is high then the following MIDI data will be a MIDI SysEx message. If it is low then the following data is any of the other existing MIDI message formats. The "Joined with Previous Frame" (JPF) bit indicates whether the MIDI data is a continuing part of data sent in a previous packet.

The "# of Valid Bytes" field indicates the number of valid MIDI bytes minus one. The LSByte of the "Control Message" field should be used to indicate the MIDI cable number. The other byte should not be used. MIDI bytes should be encapsulated in the 4 bytes provided by the control data field. If there are less then 4 MIDI bytes, they should be left justified within those 4 bytes.

GMICS Control Message Type

GMICS control is a native control-messaging scheme that is described in the following sections. This section discusses the nature of the GMICS control message type byte.

| GMICS Control Message Type Byte | | | | | | | |
|---|---|---|---|---|---|---|---|
| B7 | B6 | B5 | B4 | B3 | B2 | B1 | B0 |
| 1 | CDV | JPF | Channel # | | | | |

The MSB in the "Control Message Type Byte" is the quintessential factor in determining whether the corresponding two bytes are GMICS control or some other format. If the MSB is high then the following bytes are GMICS control data.

The "Control Data Valid" (CDV) bit determines if the GMICS message contains a 32 bit data word that corresponds to the message.

| GMICS Message Status (GMS) definition<br>Control Data Valid (CDV) definition | |
|---|---|
| Value (binary) | Description |
| 0 | The control data field contains no data |
| 1 | The control data field contains data |

As with MIDI, the JPF bit indicates whether the GMICS data is a continuing part of data sent in a previous packet. The Channel number field indicates the channel this message is intended for. The channels are defined as follows:

| Channel Number Definitions<br>Channel Number/Message Type Definitions | |
|---|---|
| Value (Decimal) | Channel Number/ Message Type |
| N–1 | Channel # n |
| 16 | Omni |
| 17–29 | Reserved |
| 30 | Reserved |
| 31 | Reserved |

When a device has a multiple channel setting (i.e. Hex Pickup) (See Appendix-A), the channel number field should indicate the first channel in the group, and all channels in the group should respond to the message.

Version Number Field

The version number field should indicate the version of the control specification being used. Only specification versions of the x.x format should be used. The 8 bit field should be divided as follows:

| Version number field | | | | | | | |
|---|---|---|---|---|---|---|---|
| B7 | B6 | B5 | B4 | B3 | B2 | B1 | R0 |
| int | int | int | frac | frac | frac | frac | frac |

Where bits 0–4 should be used for the fractional portion of the version number and bits 5–7 should be used for the integer portion of the version number.

Control Source and Destination Address Fields

GMICS addresses are 48 bits long, and divided into three 16 bit fields.

| GMICS address format | | |
|---|---|---|
| 16 bit | 16 bit | 16 bit |
| Device Address | Function Address | Parameter Address |

Device Address

All GMICS devices must contain a unique device address. Device addresses will be determined during the enumeration process presented in section 5.4. All control messages should be sent with source and destination address fields properly filled. The following addresses are reserved. They may be used if the situation permits.

| Address Name | Address Number (Hex) | Address Name | Address Number (Hex) |
|---|---|---|---|
| System Broadcast | 0xFFFF | Amplifier Daisy chain Broadcast | 0xFFF9 |
| Local Hub Broadcast | 0xFFFE | Signal Processor System Broadcast | 0xFFF8 |
| Daisy chain Broadcast | 0xFFFD | Signal Processor Hub Broadcast | 0xFFF7 |
| Startup | 0xFFFC | Signal Processor Daisy chain Broadcast | 0xFFF6 |
| Amplifier System Broadcast | 0xFFFB | Reserved | 0xFFE0–0xFFF5 |
| Amplifier Hub Broadcast | 0xFFFA | Base (STM) | 0x0000 |

The system broadcast address should be used to address all devices in a GMICS system. All GMICS devices should acknowledge this address, except for devices that neither create nor accept control information.

All devices connected to a hub's multiple type B connectors including the hub itself should respond to the local hub broadcast message. If a hub generates this message or receives this message on one of its type B connectors it should not pass this through its type A connector if one exists. If a message is received with this address on a hub's type A connector, it should pass it along to all its ports.

The daisy chain broadcast address should be used to address all devices within a daisy chain. If a hub receives a message with this address on one of its type B connectors, it should not pass to any other of its ports, both type A and B. If a hub generates this message it should only send it down one of its type B ports, and never through its type A port. If a hub receives this message from its A port, it should pass to all devices attached to it.

The amplifier system, hub, and daisy chain broadcast messages should be handled in the same fashion as their general counterparts (i.e. System broadcast), except only amplifiers need to acknowledge this address. This holds true for the predefined signal processor addresses and any other device addresses that may later be defined.

The startup and base addresses should be used as mentioned above.

Function Address

We define a function as either an effect or an assignable controller. Hence all effects and assignable controllers should have a 16-bit address assigned by the manufacturer. Devices will query for these addresses. The following addresses are reserved:

| Reserved Function Addresses | | | |
|---|---|---|---|
| Address Name | Address Number (Hex) | Address Name | Address Number (Hex) |
| Reserved | 0xFFFF | (Not in use) NIU | 0x0000 |

The NIU address should be used when there is no address needed in this field. This includes when a message is directed at a device itself, and not one of its functions.

Parameter Address

A parameter is currently defined as any effect parameter. By effect parameter we are referring to things such as chorus depth, delay time, etc. This definition may expand as needed. This means that manufactures should assign unique 16 bit addresses for all parameters that may be controlled by another device.

The following addresses are reserved:

| Reserved Function Addresses | | | |
|---|---|---|---|
| Address Name | Address Number (Hex) | Address Name | Address Number (Hex) |
| Reserved | 0xFFFF | (Not in use) NIU | 0x0000 |

As with the Function address field, the NIU address should be used when there is no address needed in this field.

Message Field and Data Field

GMICS control provides a 16-bit message field. These messages are defined by the GMICS organization. A 32-bit data field is also provided. The following are reserved messages:

| Reserved message spaces<br>Reserved Control Messages | | |
|---|---|---|
| Value (hex) | Control Message Types | Description of Data |
| 0x0000 | Reserved | |
| 0xFFFF | Reserved | |

Effect Parameters

Effect Parameters require no message in regards to their actual value. Effect parameter values are communicated by supplying the proper address and correct data value.

All data values that are in regards to an effect parameter should be a 32 bit floating point number in-between 0 and 1. It will be the responsibility of the individual signal processing devices to properly interpret the values as necessary.

A message is provided for signal processing devices to return a string that represents the current parameter value. A request message is also provided for devices that seek to obtain this information.

| Value (hex) | Control Message Types | Description of Data |
|---|---|---|
| 0x0030 | Return parameter value | Actual parameter value in 16 bit Unicode ™ |
| 0x0031 | Request parameter value | //ND |

Parameter value messages
Enumeration Messages

The string format of the parameter value should be in 16 bit Unicode™, two characters per frame.

Enumeration messages
Enumeration Messages

| Value (hex) | Control Message Types | Description of Data |
|---|---|---|
| 0x0001 | Enumerate devices | Next device address. Expressed as 16 bit right justified integer |
| 0x0002 | Address offset return | Returns to a hub or the STM the next address that should be used Should be expressed as 16 bit right justified integer |
| 0x0003 | Request new device address | //ND |
| 0x0004–0x0008 | Reserved | |

All current enumeration messages that require data use a 16 bit integer. The 16 bit integer data words should be right justified within the 32 bits allowed for data.

Address & Name Querying Messages

These messages are provided so devices can build a database of addresses and friendly names.

Address & Name Querying

| Value (hex) | Control Message Types | Description of Data |
|---|---|---|
| 0x0009 | Query device addresses | //ND |
| 0x000A | Query function addresses | //ND |
| 0x000B | Query Parameter addresses | //ND |
| 0x000C | Return device address | //ND Address should be retrieved from the source address fields |
| 0x000D | Return Function address | //ND Address should be retrieved from the source address fields |
| 0x000E | Return Parameter address | //ND Address should be retrieved from the source address fields |
| 0x000F | Query device friendly names & addresses | //ND |
| 0x0010 | Query Function friendly names & addresses | //ND |
| 0x0011 | Query Parameter friendly names & addresses | //ND |
| 0x0012 | Return device friendly name & address | Devices friendly name in 16 bit UNICODE ™. Address in source address field |
| 0x0012 | Return function friendly names & address | Functions friendly name in 16 bit UNICODE ™. Address in source address field |
| 0x0014 | Return parameter friendly name & address | Parameters friendly name in 16 bit UNICODE ™. Address in source address field |
| 0x0015–0x001F | Reserved | |

Address & Name Querying Messages

Although messages are provided for address requests only, it is recommended that the address and friendly name messages be used.

Friendly names should be supplied in 16 bit Unicode™, two characters per a frame. Names should be unique. This is best accomplished by incorporating the manufacturer's name in some fashion. Names should be limited to 16 characters. Use abbreviations if necessary.

Channel Messages

| Value (hex) | Control Message Types | Description of Data |
|---|---|---|
| 0x0020 | Channel on/off | 16 bit data word (see below) |
| 0x0021–0x002F | Reserved | |

Channel messages

The channel on/off message is a single packet message that can be used turn channels on and off. When using this message the 32 bit data field should be formatted as follows:

| Byte # | B7 | B6 | B5 | B4 | B3 | B2 | B1 | B0 |
|---|---|---|---|---|---|---|---|---|
| 1 | Channel #16 | Channel #15 | Channel #14 | Channel #13 | Channel #12 | Channel #11 | Channel #10 | Channel #9 |
| 0 | Channel #8 | Channel #7 | Channel #6 | Channel #5 | Channel #4 | Channel #3 | Channel #2 | Channel #1 |

Data format for channel on/off message

Byte 0 represents the least significant byte of the 32-bit data field. A value of 1 indicated channel on, and a value of 0 indicates channels off.

Device Classification

GMICS allows for devices to send a 32 bit word that identifies a device's class and functionality.

A device class word is formatted as follows:

| B31–B24 (Byte 3) | B23–B16 (Byte 2) | B15–B8 (Byte 1) | B7–B0 (Byte 0) |
|---|---|---|---|
| Instrument/ Device Type | Instrument/ Device Function | Instrument/ device Function | Instrument/ device Function |

Device Class Word Format

Instrument/Device type Field

This field is devoted to defining the instrument or device. Device/Instrument definitions are listed below.

Instrument/Device Type Definitions

| Value (binary) | Instrument/device types |
|---|---|
| 0000 0000 | Reserved |
| 0000 0001 | Acoustic Guitar |
| 0000 0010 | Electric Guitar |
| 0000 0011–1111 1111 | Reserved |

Instrument/Device Type Field Definitions

As each instrument and amplifier are connected into a hub 28 on the stage via simple RJ-45 network connectors, they are immediately identified by the sound board 22 which is really a PC computer with a Universal Control Surface (FIG. 3) giving the sound professional complete control of the room. Microphones are actually placed at critical areas throughout the room to audit sound during the performance. The relative levels of all instruments and microphones are stored on a RW CD ROM disc, as are all effects the band requires. These presets are worked on until they are optimized in studio rehearsals, and fine tuning corrections are recorded during every performance.

The guitar player puts on his headset 27, which contains both a stereo (each ear) monitor and an unobtrusive microphone. In addition, each ear piece has an outward facing mike allowing sophisticated noise canceling and other sound processing. The player simply plugs this personal gear directly into his guitar 12 and the other players do the same with their respective instruments. The monitor mix is automated and fed from different channels per the presets on the CD-ROM at the board. The monitor sound level is of the artists choosing (guitar player is loud).

The guitar player has a small stand-mounted laptop 17 (FIG. 2) that is GMICS enabled. This allows sophisticated visual cues concerning his instrument, vocal effects and even lyrics. The laptop 17 connects to a pedal board 15 that is a relatively standard controller via a USB cable 16 to a connector on the laptop 17. Another USB cable is run to the amplifier 13, which is really as much of a specialized digital processor as it is a device to make loud music. This guitar 12 is plugged into this amplifier 13, and then the amplifier 13 is plugged into the hub 28 using the GMICS RJ-45 cables 11.

Instrument/Device Function Field

Electric Guitar

| Byte # | B7 | B6 | B5 | B4 | B3 | B2 | B1 | B0 |
|---|---|---|---|---|---|---|---|---|
| 2 | Mic | Head-phones | Hex Pickup | Mono Pickup 1 | Mono Pickup 2 | Mono Pickup 3 | Reserved | Reserved |
| 1 | Volume | Tone | Pickup Selector | Effect Selector | Reserved | Reserved | Reserved | Reserved |
| 0 | Reserved | Reserved | Reserved | Reserved | Reserved | Reserved | Reserved | Reserved |

Electric Guitar Function Field

Acoustic Guitar

| Byte # | B7 | B6 | B5 | B4 | B3 | B2 | B1 | B0 |
|---|---|---|---|---|---|---|---|---|
| 2 | Mic | Head-phones | Hex Pickup | Mono Pickup 1 | Reserved | Reserved | Reserved | Reserved |
| 1 | Volume | Tone | Pickup Selector | Effect Selector | Reserved | Reserved | Reserved | Reserved |
| 0 | Reserved | Reserved | Reserved | Reserved | Reserved | Reserved | Reserved | Reserved |

Acoustic Guitar Function Field

Use of GMICS System

Typical arrangements of musical instruments and related audio and control hardware in a GMICS system are shown in FIGS. 1 and 2.

Each of the instruments and the microphones are digital. Each of the amplifiers, preamplifiers and the soundboard are connected using the GMICS data link described above. The stage has a hub 28 with a single cable (perhaps an optical fiber) running to the control board 22. An optical GMICS data link will allow over a hundred channels of sound with a 32 bit–192 kHz digital fidelity, and video on top of that.

The laptop 17 contains not only presets, but stores some of the proprietary sound effects programs that will be fed to the DSP in the amplifier, as well as some sound files that can be played back. Should the drummer not show up, the laptop can be used.

The guitar player strums his instrument once. The laptop 17 shows all six strings with instructions on how many turns of the tuner are required to bring the instrument in tune, plus a meter showing the degree of tone the strings have (i.e., do they need to be replaced). The DSP amplifier can adjust the guitar strings on the fly to tune, even thought they are out of tune, or it can place the guitar into different tunings. This player, however, prefers the "real" sound so he turns off the auto-tune function.

The best part of these new guitars is the additional nuance achieved by squeezing the neck and the touch surfaces that are not part of the older instruments. They give you the ability to do so much more musically.

The sound technician, for his part is already prepared. The room acoustics are present in the "board/PC". The band's RW CD-ROM contains a program that takes this info and adjusts their entire equipment setup through out the evening. The technician just needs to put a limit on total sound pressure in the house, still and always a problem with bands, and he is done except for monitoring potential problems.

The complexity of sound and room acoustic modeling could not have been addressed using prior art manual audio consoles. Now, there is sophisticated panning and imaging in three dimensions. Phase and echo, constant compromises in the past, are corrected for digitally. The room can sound like a cathedral, opera house, or even a small club.

The new scheme of powered speakers 18 throughout is also valuable. Each speaker has a digital GMICS input and a 48 VDC power input. These all terminate in a power hub 19 and a hub at the board 22. In larger rooms, there are hubs throughout the room, minimizing cable needs. Each amplifier component is replaceable easily and each speaker is as well. The musician has the added components and can switch them out between sets if necessary.

The GMICS system dispenses with the need for walls of rack effects and patch bays. All of the functionality of these prior art devices now resides in software plug-ins in either the board-PC or the attached DSP computer. Most musicians will bring these plug-ins with them, preferring total control over the performance environment.

The band can record their act. All the individual tracks will be stored on the board-PC system and downloaded to a DVD-ROM for future editing in the studio.

To set up the GMICS system, the players put their gear on stage. They plug their instruments into their amplifiers, laptops, etc. These are, in turn, plugged into the GMICS Hub. The band presets are loaded and cued to song 1. The house system goes through a 30-second burst of adjustment soundtrack, and then the band can be introduced.

The keyboard business several years ago went to a workstation approach where the keyboard product became more than a controller (keys) with sounds. It became a digital control center with ability to control other electronic boxes via midi, a sequencer and included very sophisticated (editing) tools to sculpt the sounds in the box. It included a basic amount of reverb and other sound effects that had been external previously.

In the GMICS system, the guitar amplifier can be a workstation for the guitar player, encompassing many effects that were previously external. In effect, the amplifier is actually become part of the player's control system, allowing control via the only appendage the player has that is not occupied playing, his foot. Additionally, a small stand mounted laptop will be right by the player where he can make more sophisticated control changes and visually see how his system is functioning. The view screen can even allow the lyrics and chord changes to be displayed in a set list.

The amplifier in the new GMICS system will allow flexible real time control of other enhancements and integration into the computer and future studio world.

The amplifier can be separated into its constituent parts:

The preamplifier 1 (the controls, or the knobs);

The preamplifier 2 (the sound modifier);

The power stage (simple amplification);

The speakers (create the sound wave envelope).

The cabinet (esthetics and durability);

This is a lot of functionality when you look at the constituent components. The GMICS system introduces a novel technology and a whole new way of looking at a musical instrument amplifier. Many designers and companies have already identified the constituents of the whole and marketed one of them as a single purpose product with modest success. But, just as a controller keyboard (one without the sounds) has not made a major market penetration, the single purpose constituent is not satisfying to the player. The GMICS Workstation encompasses all of the constituents in an easy to use form.

As described above, the GMICS Link uses currently available components, the Ethernet standard (the communications protocol), a commonly used RJ-45 connector and a new communications protocol utilizing Internet type formatting. This allows the system to send ten channels of digital musical sound over standard cables directly from the instrument for further processing and amplification. A new upgraded MIDI standard signal along with a music description language can also travel over this cable. This scheme allows for up to phantom instrument power as described over that same cable to power circuits in the instrument, including D/A conversion.

The GMICS circuit board is very small and uses custom application specific integrated circuits (ASIC) and surface mount technology. It will connect to standard pick-ups and CPA's in classic guitars and is particularly suited for new hexaphonic pick-ups that provide an individual transducer for every string)

The GMICS Enabled Musical Instrument

The only noticeable hardware difference in GMICS enabled traditional instruments will be the addition of a RJ-45 female connector, and a small stereo headphone out. Of course, this innovation makes a host of new possibilities possible in the design of new modern instruments. Older instruments will be able to access most of the new functionality by simply replacing the commonly used monophonic audio connector with a new RJ-45 connector and a tiny retrofit circuit board. Vintage values can be retained.

The original analog output will be available as always with no impact on sound, and the digital features need never be used. The GMICS system will allow access to both the digital signal and the unadulterated analog signal.

Having eight digital channels available for output, six of these will be used by each string in a six-string instrument. Two channels will be available to be input directly into the instrument for further routing. In a typical set up, one input will be a microphone from the performer's headset and the other input is a monitor mix fed from the main board. The headphones would then be the stereo monitor adjusted to the musicians liking without impacting the sound of the room.

The physical connector will be a simple, inexpensive and highly reliable RJ-45 locking connector, and category 5 stranded 8-conductor cable.

A new hex pickup/transducer will send 6 independent signals to be processed. The transducer is located in the stop bar saddles on the guitar bridge. Alternatively, the classic analog signal can be converted post CPA to a digital signal from the classic original electromagnetic pick-ups. There are also two analog signal inputs that are immediately converted into a digital signal (A/D converter) and introduced into the GMICS data stream.

This GMICS ASIC and the GMICS technology can be applied to virtually every instrument, not just guitars.

The preamplifier 1 (the Controls, or the Knobs)

The Control Surface

The knobs or controls for the current generation of amplifiers are unusable in a performance setting, and practically in virtually every other setting. It is very difficult to adjust the control knobs in the presence of 110 dB of ambient sound level. Utilizing both the GMICS and USB protocols, a communication link is available with all components of the performance/studio system. Any component can be anywhere without degrading the sound. The GMICS standard includes a channel for high-speed control information using the MIDI format but with approximately one-hundred times the bandwidth. Thus, the GMICS system is backward compatible with the current instruments utilizing MIDI (most keyboards and sound synthesizers).

The display and knobs will be a separate unit. In the GMICS system, this is referred to as the physical control surface that will be plugged into either the Master Rack directly, or into a laptop computer via a USB connector. When using the laptop, it will function as the visual information screen showing various settings, parameters, etc. Software resident on the laptop will be the music editor allowing control over infinite parameters.

This laptop will be unobtrusive but highly functional and the settings can be displayed on this screen visible from a distance of 12 feet to a player with normal vision. It will have a USB connection. There will also be a pedal controller with a USB or GMICS out to the Master Rack where processing shall take place. Because both GMICS and USB have phantom power, both the Control Surface and the Foot Controller have power supplied via their connectors. Software drivers for major digital mixers and music editors will allow the controller function to be duplicated in virtually any environment.

The foot controller will have one continuous controller pedal, one two-dimensional continuous controller pedal, and eleven-foot switches clustered as above.

The preamplifier 2 (the Sound Modifier)

The Master Rack Unit

The Master Rack unit is a computer taking the digital GMICS unprocessed signals in and outputting the GMICS processed digital signals out for distribution (routing). The Master Rack will be in a cabinet enclosure that will allow five rack unit. The Global Amplification System will use two of these, and the other three will allow any rack-mounted units to be added.

The Master Rack enclosure is rugged with covers and replaceable Cordura™ gig bag covering. It will meet UPS size requirements and is extremely light. The three empty racks are on slide-in trays (which come with the unit) but will allow the effects devices to be removed easily, substituted and carried separately. The rack trays will make electrical contact with the mother board unit, so that stereo input, stereo output, two foot switch inputs, and digital input and output are available so that no connections are necessary once the effects device is docked.

The Master Rack enclosure has several unconventional features which will be highly useful for the performer/player. There are power outlets, four on each side that will allow for power to the three empty rack bays, plus others. The power outlets will allow wall plug power supplies (wall worts) both in terms of distance between outlets and allowing space for these unlikable supplies. The supplies are nested inside the enclosure (protected and unobtrusive) and will never have to be dealt with again. Loops will allow these supplies to be anchored in using simple tie wraps.

All rack units mount to a sliding plate on which they will rest. The effects devices can thus slide out and be replaced, similar to "hot swap" computer peripherals. A set of patch bay inputs and outputs is installed on the back plane, accessible via a hinged action from the backside of the Master Rack. The other side of the patch bay will be accessible from the top of the enclosure, which will be recessed and unobtrusive when not needed. All I/O to the integral Global Amplification System will be on the bay for flexible yet semi permanent set-ups.

The Global Amp rack units can also slide out for maintenance and replacement. One of the rack units is the control computer for the GMICS system, including a "hot swappable" hard disk, a "hot swappable" CD-RW unit, and the digital processing and signal routing and control circuits. The control unit takes the digital GMICS signals in and out and 2 USB connectors, coupled to a general purpose processing section. The processor section processes multiple digital signals intensively on a real time basis and handles all the GMICS control functions.

The rack unit uses an internal SCSI interface to communicate with outboard storage devices. This allows not only modification of the sound, but the ability to record and store musical signals for real time play back. The unit has a built in Echoplex™, plus the ability to store large programs to load from cheap hard media. Using the SCSI protocol allows the use of hard disks, ZIP drives, CD drives, etc. to minimize use of expensive RAM.

The other rack units include a power supply and other "high voltage" relays, etc. The power supply is preferably a switching supply that can be used throughout the world. The power outlets for the rack bays are connected to a transformer, which can be switched in or out to accommodate worldwide use even for these effects.

The Master Rack will nest on top of the Base Unit/Sub Woofer and will extend from the Base via microphone type locking extension rods. Thus, the unit can be raised to a level to be easily accessed and view by the performer/player.

A 48 VDC power bus will be provided. Modules stepping this down to common voltages for non-AC boxes will be available (i.e. 12 VDC, 9 VDC). This will eliminate ground loops and heavy wall plug power supplies.

3. The Power Stage (Simple Amplification)

The major effort in amplification of a signal deals with the power supply section, particularly when the amplification is at high levels. The GMICS system devices use conventional switching power supplies to supply standard 48 VDC. This will address issues of certification in various countries, will allow the "amplifier" to work in any country around the world, reduce weight, insure safety and increase reliability and serviceability.

4. The Speakers (Sound Modifier, Create the Sound Envelope)

The speakers have both a digital GMICS signal and 48 VDC power input. Optionally, the speaker can have a built in power supply and thus could take AC in.

The speaker cabinet can have a built in monitoring transducer that sends information back to the Master Rack via the GMICS Link, allowing sophisticated feedback control algorithms. Thus, with adjustments digitally on the fly by the DSP amplifier, even poor speakers can be made to sound flat or contoured to suit personal taste.

Additionally, multi-speaker arrays can be used, where individual speakers are used per guitar string in a single cabinet, giving a more spacious sound.

5. The Cabinet (Esthetics and Durability)

By "packetizing" speaker cabinets, they can be made small and scalable. In other words, the can be stacked to get increased sound levels, or even better, distributed on stage, in the studio, or throughout the performance arena. Sophisticated panning and spatialization effects can be used even in live performance. The speakers can be UPS shippable, and plane worthy.

The Universal Control Surface

Figure 3:
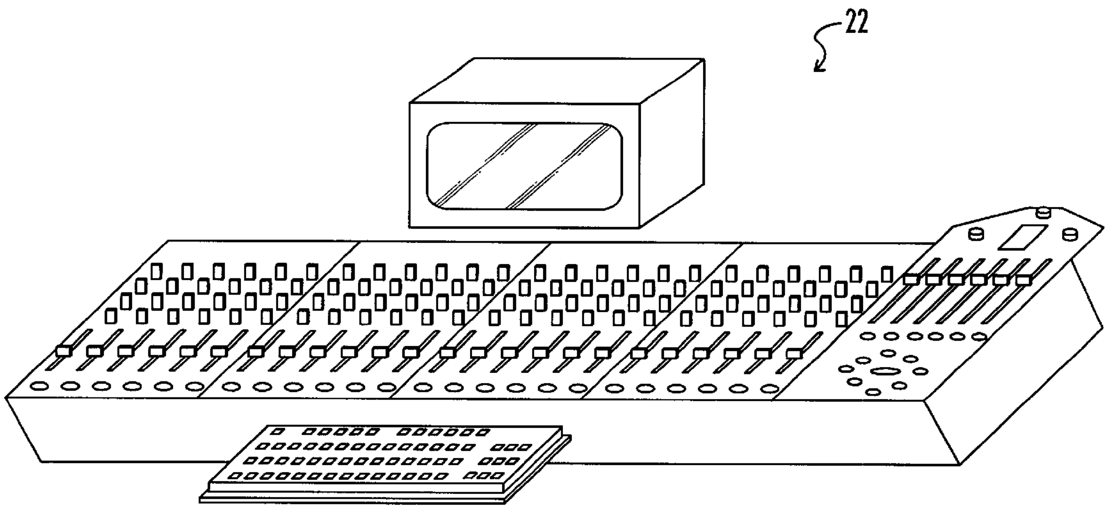
FIG. 3 is a front perspective view of a music editing control device usable in the system of this invention.

One embodiment of a universal control surface usable in the GMICS system is shown in FIG. 3.

24 Slider Type Controls

Each slider has LED's acting as VU meters (or reflecting other parameters) on the left of the slider. A single switch with an adjacent LED is at the bottom of the slider. Four rotary controls are at the top of each slider. Preferably, a full recording Jog Shuttle, recording type buttons, and "go to" buttons are included.

Standard control position templates can be printed or published that can be applied to the control surface for specific uses.

The control surface shown in FIG. 3 does not represent a true mixing console. The controls are simply reduced to a digital representation of the position of knobs, etc., and are then sent to a computer via USB, MIDI or GMICS where any real work takes place, such as mixing, editing, etc. The control surface can connect via USB to a remote PC.

Thus, a system and method has been described that allows for the universal interconnection, communication and control of musical instruments and related audio components in the digital domain.

Thus, although there have been described particular embodiments of the present invention of a new and useful Universal Audio Communications and Control System and Method," it is not intended that such references be construed as limitations upon the scope of this invention except as set forth in the following claims.

What is claimed is:

1. An audio communications and control system comprising:

a plurality of audio devices, each of the devices including a device interface module for communication of digital audio data and control data from at least one of the devices to at least one other of the devices;

a universal data link operatively connected to each of the device interface modules;

the device interface modules and universal data links are operative in combination to connect the devices together in the system and provide full duplex communication of the digital audio data and control data between the devices;

wherein the audio devices are operative to generate user data associated with a specific user of that device and the device interface modules and data links are operative to communicate the user data to other devices connected to the system;

wherein the audio data communicated between the devices is packed in system data packets;

wherein the system data packets also contain the control data;

wherein each of the system data packets comprises a plurality of data channels including a header, a plurality of audio data channels containing the digital audio data, a user data channel containing the user data, and a control data channel containing the control data; and wherein the data packet comprises 16 audio data channels.

2. The system of claim 1 wherein the audio channels contain the digital audio data in 16, 24, 28, or 32 bit format.

3. The system of claim 1 wherein one or more of the audio channels can be dynamically reassigned by the system to carry data other than audio data.

4. An audio communications and control system comprising:

a plurality of audio devices, each of the devices including a device interface module for communication of digital audio data and control data from at least one of the devices to at least one other of the devices;

a universal data link operatively connected to each of the device interface modules;

the device interface modules and universal data links are operative in combination to connect the devices together in the system and provide full duplex communication of the digital audio data and control data between the devices;

wherein the audio devices are operative to generate user data associated with a specific user of that device and the device interface modules and data links are operative to communicate the user data to other devices connected to the system;

wherein the audio data communicated between the devices is packed in system data packets; and wherein the data frames are continuously transmitted between devices in accordance with a packet timing signal that is synchronized to an audio sampling rate associated with the digital audio data.

5. The system of claim 4 wherein the audio sampling rate is selected from a group comprising 32 k, 44.1 k, 48 k, 96 k, and 192 k.

6. The system of claim 5 wherein each of the audio devices can operate at a different one of the sampling rates whereby a system can have data links operating at different sampling rates.

7. The system of claim 4 wherein the packet timing signal is generated by one of the device interface modules.

8. An audio communications and control system comprising:

a plurality of audio devices, each of the devices including a device interface module for communication of digital audio data and control data from at least one of the devices to at least one other of the devices;

a universal data link operatively connected to each of the device interface modules;

the device interface modules and universal data links are operative in combination to connect the devices together in the system and provide full duplex communication of the digital audio data and control data between the devices;

wherein the audio devices are operative to generate user data associated with a specific user of that device and the device interface modules and data links are operative to communicate the user data to other devices connected to the system;

wherein the audio data communicated between the devices is packed in system data packets;

wherein the system data packets also contain the control data;

wherein each of the system data packets comprises a plurality of data channels including a header, a plurality of audio data channels containing the digital audio data, a user data channel containing the user data, and a control data channel containing the control data; and wherein the control data channel can contain non-system control data.

9. The system of claim 8 wherein the non-system control data comprises MIDI control data.

10. An audio communications and control system comprising:

a plurality of audio devices, each of the devices including a device interface module for communication of digital audio data and control data from at least one of the devices to at least one other of the devices;

a universal data link operatively connected to each of the device interface modules;

the device interface modules and universal data links are operative in combination to connect the devices together in the system and provide full duplex communication of the digital audio data and control data between the devices;

wherein the audio devices are operative to generate user data associated with a specific user of that device and the device interface modules and data links are operative to communicate the user data to other devices connected to the system;

wherein the audio data communicated between the devices is packed in system data packets;

wherein the system data packets also contain the control data;

wherein each of the system data packets comprises a plurality of data channels including a header, a plurality of audio data channels containing the digital audio data, a user data channel containing the user data, and a control data channel containing the control data; and wherein the plurality of data channels in each system data packet can be reassigned by the system for carrying different types of data in accordance with the requirements of a specific device connected to the system.

11. The system of claim 10 wherein certain of the data channels in the system data packets are assigned by default to carry certain types of the data when a pre-determined type of audio device is connected to the system.

12. A musical performance system comprising:

a. a musical instrument including a first device interface module operative to convert audio signals generated by the instrument into digital audio data and to generate control data associated with the instrument;

b. an audio amplifier including a second device interface module operative to receive the digital audio data and the control data; and c. a first data link operatively connecting the first and second device interface modules and adapted for bi-directional communication of the digital audio data and control data.

13. The system of claim 12 further comprising an audio speaker including a third device interface module operatively connected to the audio amplifier by a second data link.

14. The system of claim 13 further comprising a system control device including a fourth device interface module operatively connected to the system by a third data link, the system control device operative to generate control data for communication to the audio amplifier.

15. The system of claim 13 wherein the first and second data links each comprise a single data cable.

16. The system of claim 15 wherein the audio speaker includes an audio power amplifier and the system further comprises a device power source electrically connected to the audio speaker over the second data link.

17. The system of claim 14 further comprising a network hub and wherein the data links are electrically connected to the hub such that the audio digital data and control data is accessible by each device interface module connected to the system.

18. The system of claim 14 wherein the musical instrument is a guitar.

19. A musical instrument comprising:

a. an audio transducer for generating analog audio data;

b. a device interface module operative to convert the analog audio data into digital audio data and to provide the digital audio data and system control data at a musical instrument output;

c. the musical instrument output including an instrument connector adapted for connection to a system data link whereby the device interface module and data link can cooperate to provide bi-directional communication of digital audio data and system control data over the data link.

20. The musical instrument of claim 19 wherein the control data includes instrument identifier data.

21. The musical instrument of claim 20 wherein the instrument identifier data includes an instrument name selectable by a user of the instrument.

22. The musical instrument of claim 21 wherein the instrument identifier data includes data describing functional characteristics of the instrument.

23. The musical instrument of claim 22 wherein the instrument connector comprises a single cable connector.

24. The musical instrument of claim 23 wherein the cable connector comprises a network cable connector.

25. The musical instrument of claim 24 wherein the network cable connector is an RJ-45 jack.

26. The musical instrument of claim 23 further comprising power supply means to receive instrument power from an external connection to the cable connector.

27. The musical instrument of claim 19 wherein the instrument is a guitar and the audio transducer is a guitar pick-up.

28. A method of arranging a plurality of electronic audio devices in an audio system comprising:

providing each of the audio devices with a device interface module adapted for communication of digital audio data generated by one or more of the devices connected to the system and for storage and communication of control data associated with that audio device;

operatively connecting the device interface modules over one or more data links, the data links adapted for full duplex communication of the digital audio data and control data to and from each device;

directing the digital audio data for use by one or more specified devices connected to the system;

communicating the digital audio data and control data across the data links in discrete data packets;

synchronizing the communication of the data packets to an audio sampling rate; and varying the audio sampling rate among the different data links in accordance with requirements of specific audio devices connected to the data links.

29. A method of arranging a plurality of electronic audio devices in an audio system comprising:

providing each of the audio devices with a device interface module adapted for communication of digital audio data generated by one or more of the devices connected to the system and for storage and communication of control data associated with that audio device;

operatively connecting the device interface modules over one or more data links, the data links adapted for full duplex communication of the digital audio data and control data to and from each device;

directing the digital audio data for use by one or more specified devices connected to the system; and providing a means for allowing a user of an audio device to select a name for that device and to include the selected device name in the control data communicated by the corresponding device interface module.

30. A method of arranging a plurality of electronic audio devices in an audio system comprising:

providing each of the audio devices with a device interface module adapted for communication of digital audio data generated by one or more of the devices connected to the system and for storage and communication of control data associated with that audio device;

operatively connecting the device interface modules over one or more data links, the data links adapted for full duplex communication of the digital audio data and control data to and from each device;

directing the digital audio data for use by one or more specified devices connected to the system;

communicating the digital audio data and control data across the data links in discrete data packets; and providing 16 channels of up to 32-bit audio data in each data packet.

31. The method of claim 30 further comprising providing user data in each data packet.

32. The method of claim 30 further comprising connecting a plurality of the data links using network cables connected to a network hub.

* * * * *